(12) United States Patent
Omari et al.

(10) Patent No.: US 10,636,150 B2
(45) Date of Patent: Apr. 28, 2020

(54) SUBJECT TRACKING SYSTEMS FOR A MOVABLE IMAGING SYSTEM

(71) Applicant: GoPro, Inc., San Mateo, CA (US)

(72) Inventors: Sammy Omari, Zurich (CH); Joseph A. Enke, Campbell, CA (US)

(73) Assignee: GoPro, Inc., San Mateo, CA (US)

( * ) Notice: Subject to any disclaimer, the term of this patent is extended or adjusted under 35 U.S.C. 154(b) by 309 days.

(21) Appl. No.: 15/656,559

(22) Filed: Jul. 21, 2017

(65) Prior Publication Data

US 2018/0025498 A1 Jan. 25, 2018

Related U.S. Application Data

(60) Provisional application No. 62/372,549, filed on Aug. 9, 2016, provisional application No. 62/364,960, filed on Jul. 21, 2016.

(51) Int. Cl.
| | |
|---|---|
| *H05B 33/00* | (2006.01) |
| *G06T 7/246* | (2017.01) |
| *G06K 9/00* | (2006.01) |
| *G06T 7/73* | (2017.01) |
| *G06K 9/78* | (2006.01) |
| *B64C 39/02* | (2006.01) |
| *B64D 47/08* | (2006.01) |
| *G01C 21/16* | (2006.01) |
| *G01C 19/00* | (2013.01) |

(52) U.S. Cl.
CPC ............ *G06T 7/248* (2017.01); *B64C 39/024* (2013.01); *B64D 47/08* (2013.01); *G01C 21/165* (2013.01); *G06K 9/0063* (2013.01); *G06K 9/00711* (2013.01); *G06K 9/00771* (2013.01); *G06K 9/78* (2013.01); *G06T 7/74* (2017.01); *B64C 2201/027* (2013.01); *B64C 2201/108* (2013.01); *B64C 2201/127* (2013.01); *B64C 2201/146* (2013.01); *G01C 19/00* (2013.01); *G06T 2207/10032* (2013.01); *G06T 2207/30196* (2013.01); *G06T 2207/30232* (2013.01)

(58) Field of Classification Search
CPC ..................................................... G06T 7/248
USPC ........................................................ 348/144
See application file for complete search history.

(56) References Cited

U.S. PATENT DOCUMENTS

| | | |
|---|---|---|
| 9,769,387 B1 | 9/2017 | Beard |
| 1,018,758 A1 | 1/2019 | Beard |
| 2008/0267451 A1 | 10/2008 | Karazi |
| 2014/0003661 A1* | 1/2014 | Kwon ................ H04N 5/23293 |
| | | 382/103 |
| 2014/0336848 A1 | 11/2014 | Saund |

(Continued)

*Primary Examiner* — Yulin Sun
(74) *Attorney, Agent, or Firm* — Young Basile Hanlon & MacFarlane, P.C.

(57) ABSTRACT

A method for tracking a subject in successive image frames includes obtaining previous image frames with an imaging device, processing the previous image frames, obtaining motion information of the imaging device and a subject, determining a region of interest, obtaining a subsequent image frame, and processing the region of interest. The processing includes determining previous frame positions of the subject therein. The motion information is obtained with sensors physically associated with one or more of the imaging device and the subject. The region of interest is located in a predetermined spatial relationship relative to a predicted frame position of the subject.

18 Claims, 20 Drawing Sheets

(56) References Cited

U.S. PATENT DOCUMENTS

2015/0109457 A1   4/2015  Stout
2015/0279021 A1*  10/2015 Wu .......................... G06T 3/40
                                                                    382/103
2018/0095459 A1   4/2018  Bachrach

* cited by examiner

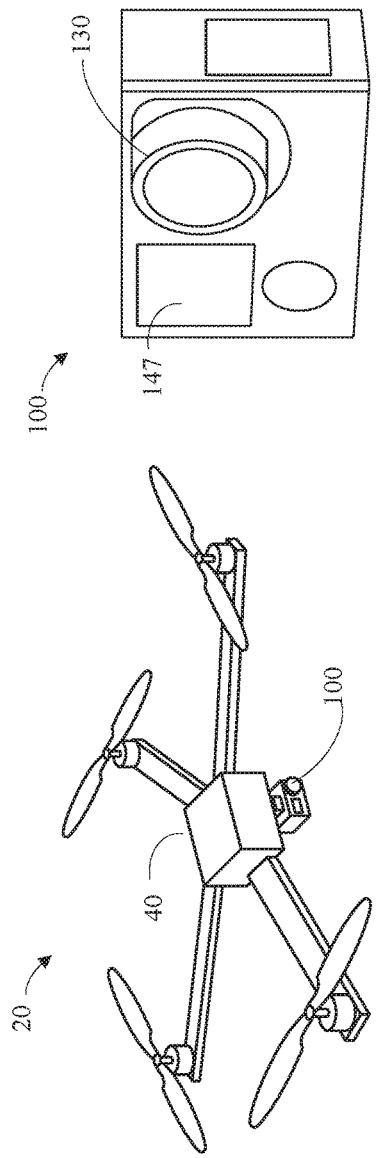
FIG. 2B
FIG. 2A
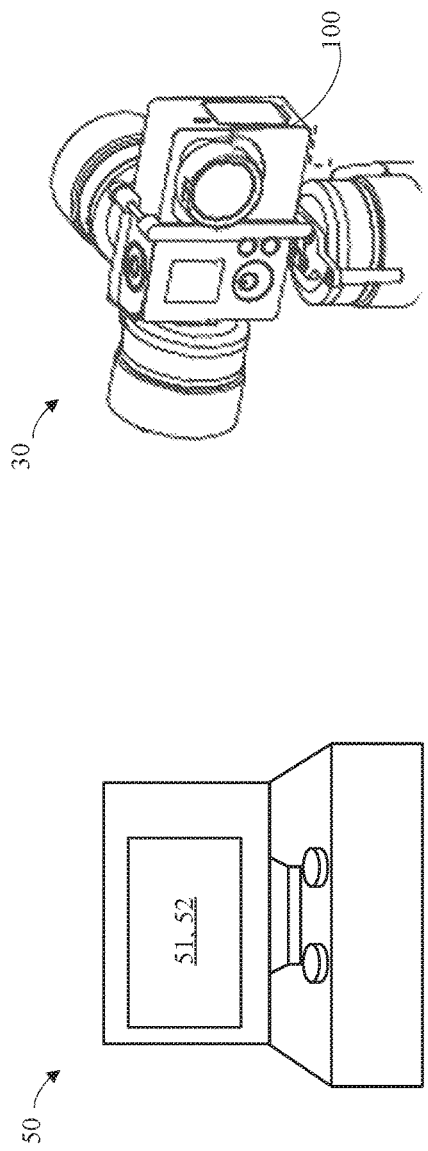
FIG. 2D
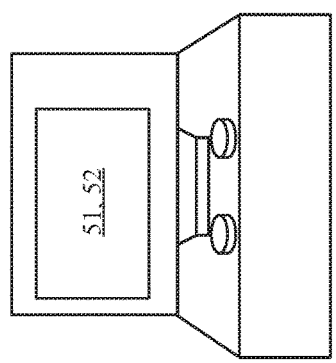
FIG. 2C

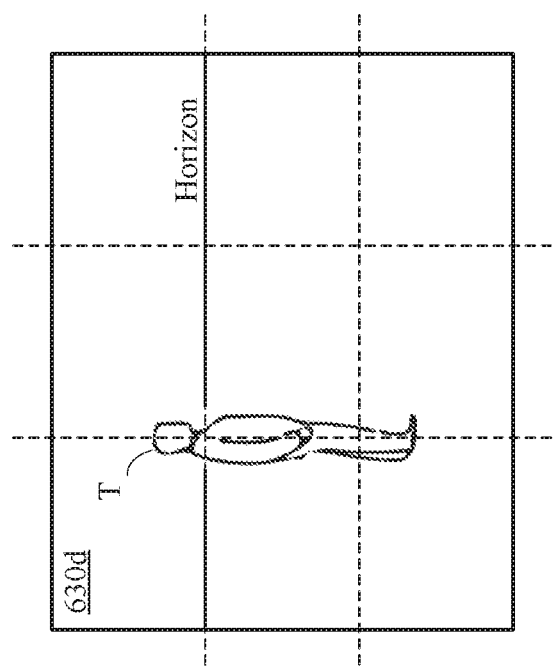

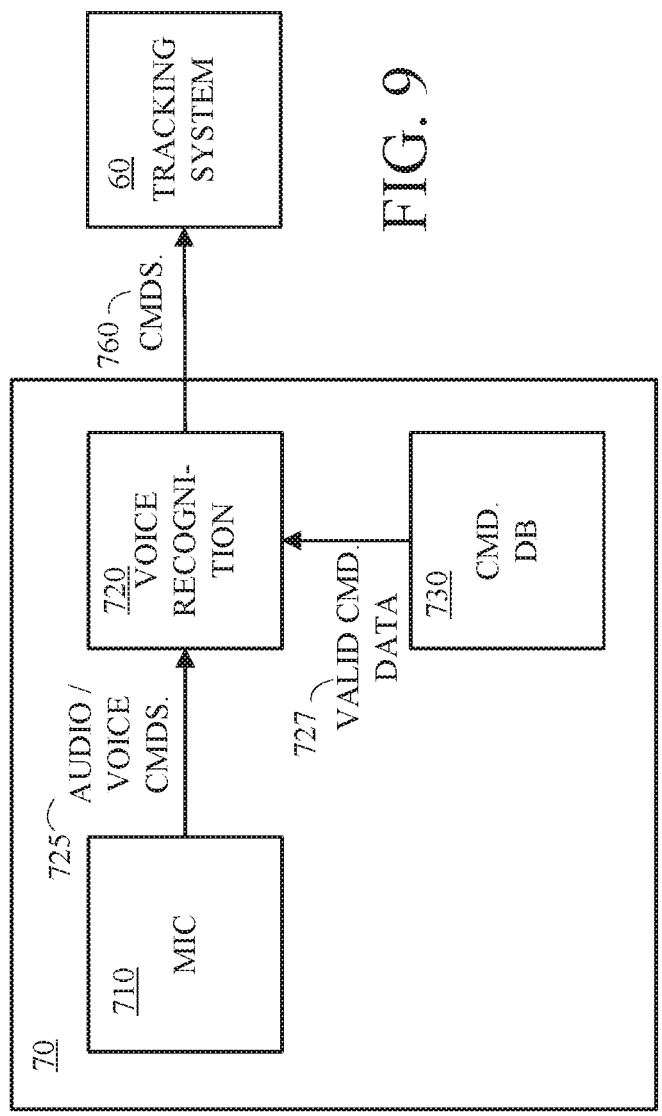

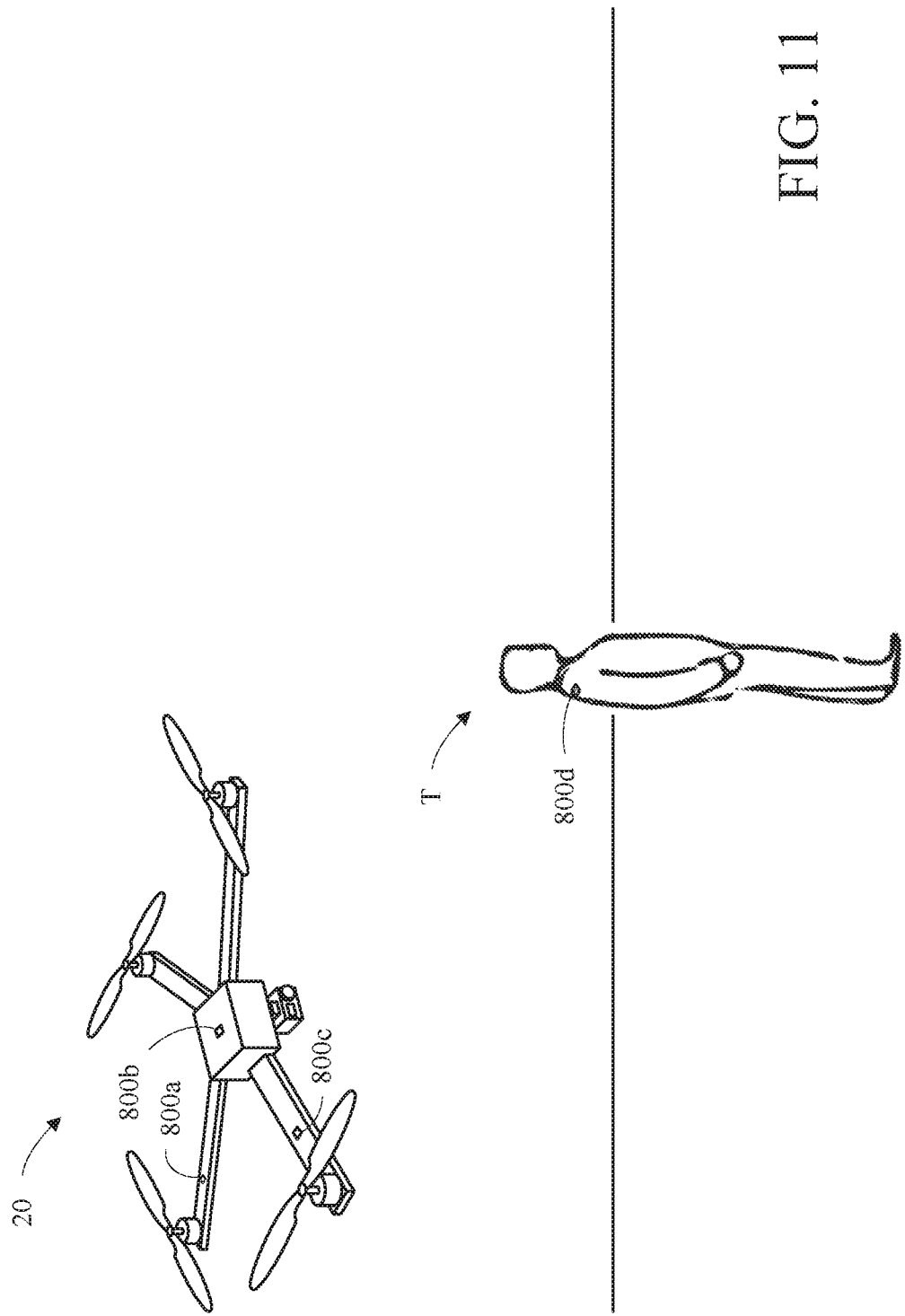

SUBJECT TRACKING SYSTEMS FOR A MOVABLE IMAGING SYSTEM

CROSS-REFERENCE TO RELATED APPLICATION(S)

This application claims priority to and the benefit of U.S. Provisional Application No. 62/364,960, filed Jul. 21, 2016, and U.S. Provisional Application No. 62/372,549, filed Aug. 9, 2016, the entire disclosures of which are incorporated by reference herein.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to subject tracking systems for a movable imaging platform including enhancements to location prediction, trajectory generation, voice command recognition, compositional technique, and system architecture and data-flow for tracking and synchronization.

BACKGROUND

It is desirable in many circumstances to be able to track a particular subject when recording video. Providing tracking commands to a movable imaging platform using manually operated controls may be too difficult and complex in certain situations, such as a situation where the operator of the movable imaging platform is also a subject to be tracked.

A tracking system works best when locations of the movable imaging platform and subject can be accurately known. Global Positioning System receivers can be utilized to provide a reasonable degree of accuracy, but they are not ideal in all circumstances.

It is also desirable in many circumstances to be able to track a particular subject when recording video. Once a subject has been identified in a video stream by a subject tracking system, the tracking system may automatically or semi-automatically frame the subject within the video. Furthermore, it may be desirable to limit the region in which an aerial-based subject tracking system operates in order ensure the safety of the user and at the same time ensure that the tracking system continues to function robustly.

SUMMARY

A movable imaging system may include a movable imaging assembly (MIA), such as an unmanned aerial vehicle (UAV), that has a movable imaging device, such as a camera, attached to it. The movable imaging system may also include a controller or external device that is communicatively connected to the MIA using, e.g., a wireless link.

According to an implementation, a method is provided for tracking a subject with an imaging system forming a part of a movable imaging assembly. The method incudes capturing an image frame using an imaging sensor of the imaging system and locating the subject within a region of interest in the image frame. The region of interest is determined utilizing a motion model and data from a sensor associated with the subject or the movable imaging assembly. The method can also include transferring the image frame to an external device that is connected to the MIA, displaying the transferred image frame on an external display of the external device, and displaying a bounding box around the subject in a position based on a position of the region of interest.

According to another implementation, a method is provided for tracking a subject with an imaging system forming a part of a movable imaging assembly. The method includes capturing a first image frame using an imaging sensor of the imaging system and locating the subject within the first image frame at a first set of frame coordinates. The method then includes capturing a second image frame using the imaging sensor and locating the subject within the second image frame at a second set of frame coordinates. The method further includes capturing a third image frame using the imaging sensor, determining a third set of frame coordinates at which the subject is predicted to be using a motion model and based on the first frame coordinates and the second frame coordinates, and defining a region of interest having a predefined boundary based on the third set of frame coordinates. Finally, the method includes locating the subject by searching within the region of interest.

According to another implementation, a method is provided for tracking a subject with an imaging system forming part of an MIA. The method includes specifying a constraint on movement that limits motion of the MIA relative to a frame of reference that is the target or a fixed global positioning satellite system frame and moving the MIA in accordance with the specified constraints while capturing image frames with an image sensor of the imaging system.

According to another implementation, a method is provided for tracking a target with an imaging system forming part of an MIA. The method includes defining a movable first volume positioned relative to the target having a first boundary within which the MIA may allowably move during flight. The method then includes defining a movable second volume positioned relative to the target and contained within the first volume having a second boundary within which the MIA may not allowably move during flight. The method further includes receiving, by the MIA, a movement command to a trajectory point within the second volume and moving the MIA to a modified trajectory point within the first volume that is not within the second volume and that is proximate to the trajectory point. Finally, the method includes capturing an image with an image sensor of the imaging system while the MIA is at the modified trajectory point.

According to another implementation, a method is provided for tracking a target with an imaging system forming part of an MIA. The method includes selecting a compositional technique defining a composition to apply for image frames captured with an image sensor of the imaging system, detecting a movement of the target, calculating an MIA trajectory point to achieve the composition for image frames predicted to be captured with the image sensor based on the movement of the target, moving the MIA to the calculated trajectory point, and capturing one or more image frames with the imaging system at the calculated trajectory point.

According to another implementation, a method is provided for tracking a target with an imaging system forming part of an MIA that includes specifying a constraint on movement that limits motion of the MIA relative to a frame of reference (FOR) that is the target or a fixed global positioning satellite system frame. The method also includes moving the MIA in accordance with the specified constraints while capturing image frames with an image sensor of the imaging system. In the method, the specifying of the constraint on movement includes receiving a voice command signal that is an audio signal or a digital reproduction of the audio signal, performing a speech-to-text conversion on the received voice command signal to produce converted text, searching a command database containing valid commands using the converted text to find a matching valid command that matches the converted text, and determining the constraint on movement based on the matching valid command.

According to another implementation, a method is provided for determining a distance between an MIA and a moving target being tracked by an imaging device of the MIA, including analyzing signals of ultra-wide-band transceivers (UWBTs) distributed between the MIA and the moving target, each of the UWBTs being affixed to one of the MIA and the moving target, determining a distance between the MIA and the moving target based on the analyzed signals, and providing the determined distance to a tracking system that is utilized by the MIA to track the moving target.

According to another implementation, a method is provided for tracking a subject with an imaging system forming part of an MIA. The method includes capturing a first image frame using an imaging sensor of the imaging system, transferring the first image frame to an external device that is connected to the MIA, locating the subject within the transferred first image frame at a first set of frame coordinates, displaying the transferred first image frame on an external display of the external device, and displaying a bounding box around the subject in the transferred first image frame on the external display. The method further includes capturing a second image frame using the imaging sensor, transferring the second image frame to the external device, locating the subject within the transferred second image frame at a second set of frame coordinates, displaying the transferred second image frame on the external display, and displaying a bounding box around the subject in the transferred second image frame on the external display. The method further includes capturing a third image frame using the imaging sensor, transferring the third image frame to the external device, and determining a third set of frame coordinates at which the subject is predicted to be using a motion model and based on the first frame coordinates and the second frame coordinates. Finally, the method further includes displaying a bounding box at a position related to the third set of frame coordinates on the external display.

A method for tracking a subject in successive image frames includes obtaining previous image frames with an imaging device, processing the previous image frames, obtaining motion information of the imaging device and a subject, determining a region of interest, obtaining a subsequent image frame, and processing the region of interest. The processing includes determining previous frame positions of the subject therein. The motion information is obtained with sensors physically associated with one or more of the imaging device and the subject. The region of interest is located in a predetermined spatial relationship relative to a predicted frame position of the subject.

A method for tracking a subject in successive image frames includes determining a predicted frame location of a subject, determining a region of interest, obtaining a subsequent image frame, and processing the region of interest to locate the subject. The predicted frame location is a location at which the subject is estimated to appear in a subsequent image frame to be obtained at a subsequent time. The determining of the region of interest includes determining the location of the region of interest to be in a predetermined spatial relationship relative to the predicted frame location. The obtaining of the subsequent image frame is performed at a subsequent time with an imaging device.

A movable imaging system includes a movable platform, an imaging device, and a tracking system. The movable platform is movable in real space. The imaging device is for capturing successive image frames that form a video, and is connected to the movable platform. The tracking system is for tracking a subject in the successive image frames. The tracking system locates a region of interest for a subsequent image frame at a predicted frame location of the subject in a future image frame. The predicted frame location is based on previous frame positions of the subject in the successive images, motion information of the imaging device, and motion information of the subject. The tracking system processes the region of interest of the future image frame to locate the subject in the future image frame.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

FIG. 2A is a pictorial illustration of the MIA according to an implementation.

FIG. 2B is a pictorial illustration of the imaging device according to an implementation.

FIG. 2C is a pictorial illustration of an MIA controller and user interface according to an implementation.

FIG. 2D is a pictorial illustration of the imaging device of FIG. 2B within a movement mechanism.

FIG. 8 is a pictorial representation of a video image frame that illustrates an application of the rule of thirds.

FIG. 9 is a block diagram of an implementation of a voice recognition system that may interact with a tracking system.

FIG. 11 is a pictorial representation of an MIA, such as the MIA of FIG. 2A, tracking a target using ultra-wide-band transceivers.

All original Figures disclosed herein are © Copyright 2017 GoPro Inc. All rights reserved.

DETAILED DESCRIPTION

Implementations of the present technology will now be described in detail with reference to the drawings, which are provided as illustrative examples to enable those skilled in the art to practice the technology. The figures and examples below are not meant to limit the scope of the present disclosure to a single implementation or embodiment, but other implementations and embodiments are possible by way of interchange of or combination with some or all of the described or illustrated elements. Wherever convenient, the same reference numbers will be used throughout the drawings to refer to same or like parts.

Figure 1:
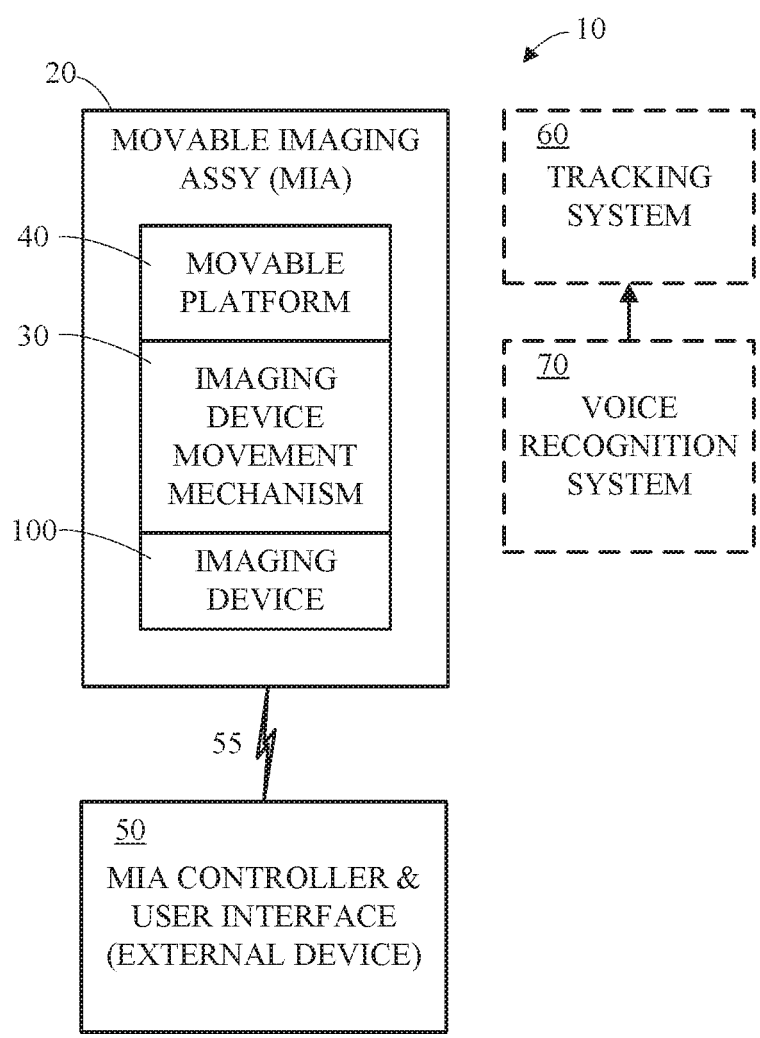
FIG. 1 is a block diagram of a movable imaging system and high-level components according to various implementations of this disclosure.

FIG. 1 is a block diagram of a movable imaging system 10 and high-level components according to various implementations of this disclosure. The movable imaging system 10 may have two primary components: MIA 20 and an external device 50, such as an MIA controller with a user interface. These components may be communicatively connected via a link 55. The link 55 may be wireless or wired. Other components may also be included within the movable imaging system 10. For example, the MIA 20 may comprise an imaging device 100, such as a camera (as used herein, the term "camera" is defined broadly to include any form of imaging device) that can be used to capture still and video images. The MIA 20 may include a movable platform 40 that can be moved positionally and/or rotationally with respect to a fixed reference ground. The MIA 20 may also include an imaging device movement mechanism 30 that allows the imaging device 100 to move positionally and/or rotationally with respect to the movable platform 40.

In some implementations, the external device 50 may correspond to a smartphone, a tablet computer, a phablet, a smart watch, a portable computer, and/or another device configured to receive user input and communicate information with the imaging device 100, imaging device movement mechanism 30, and/or movable platform 40 individually, or with the MIA 20 as a whole.

In one or more implementations, the link 55 may utilize any wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, the link 55 may be effectuated using a wired interface, e.g., HDMI, USB, digital video interface, display port interface (e.g., digital display interface developed by the Video Electronics Standards Association (VESA), Ethernet, Thunderbolt), and/or other interface.

The UI of the external device 50 may operate a software application (e.g., GoPro Studio®, GoPro App®, and/or other application) configured to perform a variety of operations related to camera configuration, control of video acquisition, and/or display of video captured by the imaging device 100. An application (e.g., GoPro App)® may enable a user to create short video clips and share video clips to a cloud service (e.g., Instagram®, Facebook®, YouTube®, Dropbox®); perform full remote control of imaging device 100 functions; live preview video being captured for shot framing; mark key moments while recording (e.g., HiLight Tag®, View HiLight Tags in GoPro Camera Roll®) for location and/or playback of video highlights; wirelessly control camera software; and/or perform other functions. Various methodologies may be utilized for configuring the imaging device 100 and/or displaying the captured information.

By way of an illustration, the UI of the external device 50 may receive a user setting characterizing image resolution (e.g., 3840 pixels by 2160 pixels), frame rate (e.g., 60 frames per second (fps)), and/or other settings (e.g., location) related to an activity (e.g., mountain biking) being captured by the user. The UI of the external device 50 may communicate these settings to the imaging device 100 via the link 55.

A user may utilize the UI of the external device 50 to view content acquired by the imaging device 100. A display of the UI of the external device 50 may act as a viewport into a 3D space of the content. In some implementations, the UI of the external device 50 may communicate additional information (e.g., metadata) to the imaging device 100. By way of an illustration, the UI of the external device 50 may provide orientation of the UI of the external device 50 with respect to a given coordinate system to the imaging device 100 to enable determination of a viewport location or dimensions for viewing of a portion of the panoramic content, or both. By way of an illustration, a user may rotate (sweep) the UI of the external device 50 through an arc in space. The UI of the external device 50 may communicate display orientation information to the imaging device 100 using a communication interface such as link 55. The imaging device 100 may provide an encoded bitstream configured to enable viewing of a portion of the content corresponding to a portion of the environment of the display location as the imaging device 100 traverses the path. Accordingly, display orientation information sent from the UI of the external device 50 to the imaging device 100 allows user selectable viewing of captured image and/or video.

In many instances, it is desirable to track a target (which may include one or more subjects) with the MIA 20. Various forms of tracking may be utilized, including those discussed below and in U.S. Provisional Patent Application Ser. No. 62/364,960, filed Jul. 21, 2016, and herein incorporated by reference in its entirety. A tracking system 60 may be utilized to implement the described forms of tracking. The tracking system 60 may comprise a processor and algorithms that are used for tracking the target. The tracking system 60 is shown in dashed lines since it may be included entirely within the MIA 20 or entirely within the external device 50, or portions of the tracking system 60 may be located or duplicated within each of the MIA 20 and the external device 50. A voice recognition system 70 may also be utilized to interact with the tracking system 60. The voice recognition system 70 is defined in more detail below.

FIGS. 2A-2D are pictorial illustrations of implementations of the components shown in FIG. 1. FIG. 2A is a pictorial illustration of the MIA 20 according to an implementation. In the implementation shown, the MIA 20 includes a movable platform 40 that is a quadcopter drone, but the invention is not limited to this implementation. The MIA 20 could be any form of an aerial vehicle or any form of movable device that is movable with respect to a fixed ground, which could include movable mechanical systems that are tied to the earth. As shown in FIG. 2A, the imaging device 100 is fixedly mounted in the front of the movable platform 40 so that it points in a direction along an axis of the movable platform 40. However, in various implementations, the mounting of the imaging device 100 to the movable platform 40 is done using the imaging device movement mechanism 30.

FIG. 2B is a pictorial illustration of the imaging device 100. In FIG. 2B, the imaging device 100 is a GoPro Hero4® camera, however any type of imaging device 100 may be utilized. The imaging device 100 may include a video camera device. FIG. 2B also shows a lens 130 of the camera, along with a display screen 147.

FIG. 2C is a pictorial illustration of an external device 50, specifically, an MIA controller and user interface according to an implementation. The user interface may further comprise a display system 51 with a display device 52. The MIA controller may further comprise a communications interface via which it may receive commands both for operation of the movable platform 40, such as the UAV or drone, and operation of the imaging device 100. The commands can include movement commands, configuration commands, and other types of operational control commands.

FIG. 2D is a pictorial illustration of the imaging device 100 within the movement mechanism 30. The movement mechanism 30 couples the imaging device 100 to the movable platform 40. The implementation of the movement mechanism 30 shown in FIG. 2D is a three-axis gimbal mechanism that permits the imaging device 100 to be rotated about three independent axes. However, the movement mechanism 30 may include any type of translational and/or rotational elements that permit rotational and/or translational movement in one, two, or three dimensions.

Figure 3:
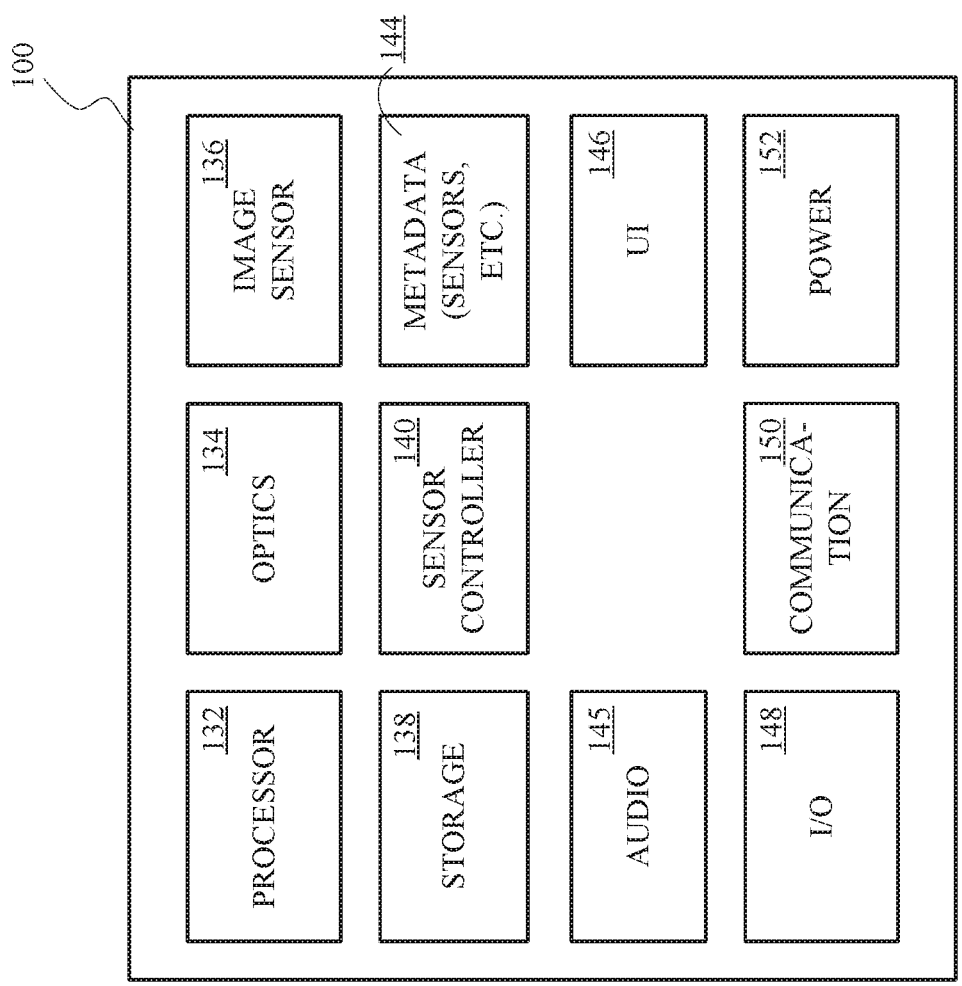
FIG. 3 is a block diagram illustrating components of an imaging device according to an implementation.

As illustrated in FIG. 3, which is a block diagram illustrating components of an imaging device 100 according to an implementation, the imaging device 100 may include a processor 132 which controls operation of the imaging device 100. In some implementations, the processor 132 may include a system on a chip (SOC), microcontroller, microprocessor, CPU, DSP, ASIC, GPU, and/or other processors that control the operation and functionality of the imaging device 100. The processor 132 may interface with mechanical, electrical, sensory, or power modules and/or a UI module 146 via driver interfaces and/or software abstraction layers. Additional processing and memory capacity may be used to support these processes. These components may be fully controlled by the processor 132. In some implementation, one or more components may be operable by one or more other control processes (e.g., a GPS receiver may include a processing apparatus configured to provide position and/or motion information to the processor 132 in accordance with a given schedule (e.g., values of latitude, longitude, and elevation at 10 Hz)).

The imaging device 100 may also include image optics 134, which may include the lens 130 as an optical element of the imaging device 100. In some implementations, the lens 130 may be a fisheye lens that produces images having a fisheye (or near-fisheye) field of view (FOV). Other types of image optics 134 may also be utilized, such as, by way of non-limiting example, one or more of a standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, the optics module 134 may implement focus controller functionality configured to control the operation and configuration of the camera lens. The optics module 134 may receive light from an object and couple received light to an image sensor 136, discussed below.

The imaging device 100 may include one or more image sensors 136 including, by way of non-limiting examples, one or more of a charge-coupled device (CCD) sensor, active pixel sensor (APS), complementary metal-oxide semiconductor (CMOS) sensor, N-type metal-oxide-semiconductor (NMOS) sensor, and/or other image sensor. The image sensor 136 may be configured to capture light waves gathered by the optics module 134 and to produce image(s) data based on control signals from a sensor controller 140, discussed below. The image sensor 136 may be configured to generate a first output signal conveying first visual information regarding an object. The visual information may include, by way of non-limiting example, one or more of an image, a video, and/or other visual information. The optics module 134 and the image sensor 136 may be embodied in a housing.

The imaging device may further include an electronic storage element 138 in which configuration parameters, image data, code for functional algorithms and the like may be stored. In some implementations, the electronic storage 138 may include a system memory module that is configured to store executable computer instructions that, when executed by the processor 132, perform various camera functionalities including those described herein. The electronic storage 138 may include storage memory configured to store content (e.g., metadata, images, audio) captured by the imaging device 100.

The electronic storage 138 may include non-transitory memory configured to store configuration information and/or processing code configured to enable, e.g., video information and metadata capture, and/or to produce a multimedia stream comprised of, e.g., a video track and metadata in accordance with the methodologies of the present disclosure. In one or more implementations, the processing configuration may include capture type (video, still images), image resolution, frame rate, burst setting, white balance, recording configuration (e.g., loop mode), audio track configuration, and/or other parameters that may be associated with audio, video, and/or metadata capture. Additional memory may be available for other hardware/firmware/software needs of the imaging device 100. The memory and processing capacity may aid in management of processing configuration (e.g., loading, replacement), operations during a startup, and/or other operations. Consistent with the present disclosure, the various components of the imaging device 100 may be remotely disposed from one another and/or aggregated. For example, one or more sensor components may be disposed distal from the imaging device 100. Multiple mechanical, sensory, or electrical units may be controlled by a learning apparatus via network/radio connectivity.

The processor 132 may interface to the sensor controller 140 in order to obtain and process sensory information for, e.g., object detection, face tracking, stereo vision, and/or other tasks.

The processor 132 may also interface one or more metadata sources 144. The metadata sources 144, in more detail, may include sensors such as an inertial measurement unit (IMU) including one or more accelerometers and/or gyroscopes, a magnetometer, a compass, a global positioning satellite (GPS) sensor, an altimeter, an ambient light sensor, a temperature sensor, a pressure sensor, a heart rate sensor, a depth sensor (such as radar, an infra-red-based depth sensor, such as a Kinect-style depth sensor, and a stereo depth sensor) and/or other sensors. The imaging device 100 may contain one or more other metadata/telemetry sources, e.g., image sensor parameters, battery monitor, storage parameters, and/or other information related to camera operation and/or capture of content. The metadata sources 144 may obtain information related to environment of the imaging device 100 and aspects in which the content is captured.

By way of a non-limiting example, the accelerometer may provide device motion information including acceleration vectors representative of motion of the imaging device 100, from which velocity vectors may be derived. The gyroscope may provide orientation information describing the orientation of the imaging device 100, the GPS sensor may provide GPS coordinates, time, and identifying location of the imaging device 100, and the altimeter may obtain the altitude of the imaging device 100. In some implementations, the metadata sources 144 may be rigidly coupled to the imaging device 100 such that any motion, orientation, or change in location of the imaging device 100 also occurs for the metadata module 144.

The sensor controller 140 and/or the processor 132 may be operable to synchronize various types of information received from the metadata sources 144. For example, timing information may be associated with the sensor data. Using the timing information, metadata information may be related to content (photo/video) captured by the image sensor 136. In some implementations, the metadata capture may be decoupled from the video/image capture. That is, metadata may be stored before, after, and in-between one or more video clips and/or images. In one or more implementations, the sensor controller 140 and/or the processor 132 may perform operations on the received metadata to generate additional metadata information. For example, the processor 132 may integrate the received acceleration information to determine a velocity profile of the imaging device 100 during a recording of a video. In some implementations, video information may consist of multiple frames of pixels using any applicable encoding method (e.g., H.262, H.264, Cineform, and/or other codec). In some implementations, the imaging device 100 may include, without limitation, video, audio, capacitive, radio, vibrational, ultrasonic, infrared, radar, LIDAR and/or sonar, and/or other sensory devices.

The imaging device 100 may include audio devices 145, such as one or more microphones configured to provide audio information that may be associated with images acquired by the image sensor 136. Two or more microphones may be combined to form a microphone system that is directional. Such a directional microphone system can be used to determine the direction or location of a sound source and/or to eliminate undesirable noise originating in a particular direction. Various audio filters may be applied as well. The sensor controller 140 may receive image and/or video input from the image sensor 136 and audio information from the audio devices 145. In some implementations, audio information may be encoded using, e.g., AAC, AC3, MP3, linear PCM, MPEG-H, and/or other audio coding formats (audio codec). In one or more implementations of spherical video and/or audio, the audio codec may include a 3-dimensional audio codec. For example, an Ambisonics codec can produce full surround audio including a height dimension. Using a G-format Ambionics codec, a special decoder may not be required.

In some implementations, one or more external metadata devices (not shown) may interface to the imaging device 100 via a wired link (not shown), e.g., HDMI, USB, coaxial audio, and/or other interface. The metadata obtained by the imaging device 100 may be incorporated into the combined multimedia stream using any applicable known methodologies.

The imaging device 100 may include its own display (e.g., display 147 shown in FIG. 2B) as a part of its UI 146. The display may be configured to provide information related to camera operation mode (e.g., image resolution, frame rate, capture mode, sensor mode, video mode, photo mode), connection status (connected, wireless, wired connection), power mode (e.g., standby, sensor mode, video mode), information related to metadata sources (e.g., heart rate, GPS), and/or other information. The UI 146 may include other components (e.g., one or more buttons) configured to enable the user to start, stop, pause, and/or resume sensor and/or content capture. User commands may be encoded using a variety of approaches, including but not limited to duration of button press (pulse width modulation), number of button presses (pulse code modulation), or a combination thereof. By way of an illustration, two short button presses may initiate sensor acquisition mode, and a single short button press may be used to communicate (i) initiation of video or photo capture and cessation of video or photo capture (toggle mode) or (ii) video or photo capture for a given time duration or number of frames (burst capture). Other user command or communication implementations may also be realized, e.g., one or more short or long button presses.

In some implementations, the UI 146 may include virtually various types of device capable of registering inputs from and/or communicating outputs to a user. These may include, without limitation, display, touch, proximity sensitive interface, light, sound receiving/emitting devices, wired/wireless input devices and/or other devices. The UI module 146 may include a display, one or more tactile elements (e.g., buttons and/or virtual touch screen buttons), lights (LED), speaker, and/or other UI elements. The UI module 146 may be operable to receive user input and/or provide information to a user related to operation of the imaging device 100. The imaging device 100 may further include, in some implementations, an input/output (I/O) module 148. The I/O module 148 may be configured to synchronize the imaging device 100 with other cameras and/or with other external devices, such as a remote control, a second capture device, a smartphone, the UI of the external device 50 of FIG. 1A, and/or a video server. The I/O module 148 may be configured to communicate information to/from various I/O components. In some implementations the I/O module 148 may include a wired and/or wireless communications interface (e.g., Wi-Fi, Bluetooth, USB, HDMI, Wireless USB, Near Field Communication (NFC), Ethernet, a radio frequency transceiver, and/or other interfaces) configured to communicate to one or more external devices (e.g., UI of the external device 50 in FIG. 1 and/or another metadata source). In some implementations, the I/O module 148 may interface with LED lights, a display, a button, a microphone, speakers, and/or other I/O components. In one or more implementations, the I/O module 148 may interface to an energy source, e.g., a battery, and/or a DC electrical source.

In some implementations, the I/O module 148 of the imaging device 100 may include one or more connections to external computerized devices to allow for, among other things, configuration and/or management of remote devices, e.g., as described above with respect to FIG. 1 and/or as described below with respect to FIG. 3. The I/O module 148 may include any of the wireless or wireline interfaces discussed above, and further, may include customized or proprietary connections for specific applications.

In some implementations, a communication device 150 may be coupled to the I/O module 148 and may include a component (e.g., a dongle) having an infrared sensor, a radio frequency transceiver and antenna, an ultrasonic transducer, and/or other communications interfaces used to send and receive wireless communication signals. In some implementations, the communication device 150 may include a local (e.g., Bluetooth, Wi-Fi) and/or broad range (e.g., cellular LTE) communications interface configured to enable communications between the imaging device 100 and a remote device (e.g., the UI of the external device 50 in FIG. 1). The communication device 150 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, the communication device 150 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the communication device 150 may be represented using formats including one or more of hypertext markup language (HTML), extensible markup language (XML), and/or other formats. One or more exchanges of information between the imaging device 100 and outside devices may be encrypted using encryption technologies including one or more of secure sockets layer (SSL), transport layer security (TLS), virtual private networks (VPNs), Internet Protocol security (IPsec), and/or other encryption technologies.

The imaging device 100 may include a power system 152 tailored to the needs of the applications of the imaging device 100. For example, for a small-sized, lower-power action camera having a wireless power solution (e.g. battery, solar cell, inductive (contactless) power source, rectification, and/or other power supply) may be used.

Location Prediction for Subject Tracking

Figure 4A:
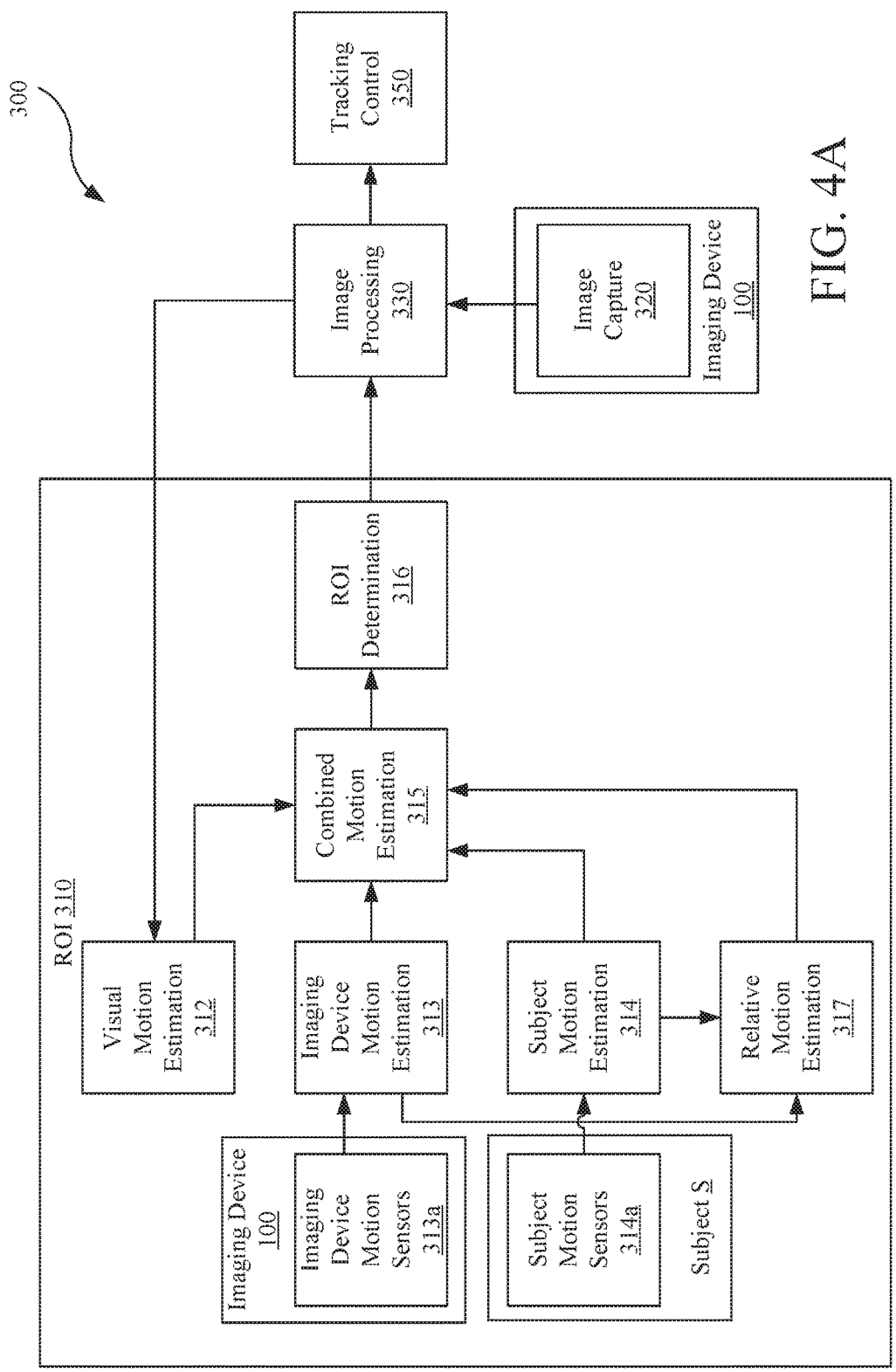
FIG. 4A is a block diagram of a tracking system.
Figure 4B:
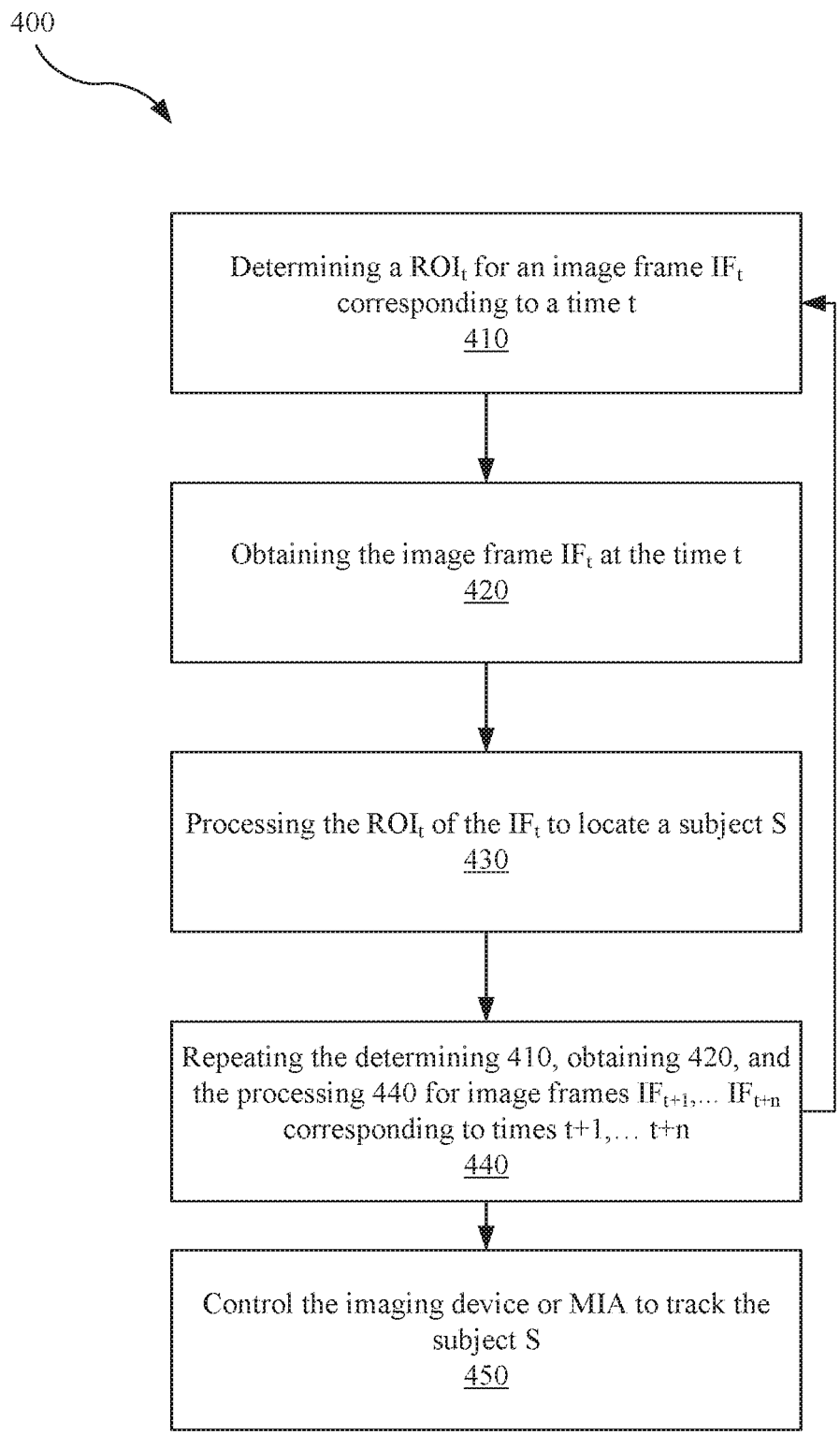
FIG. 4B is a is a flowchart of a technique for tracking a subject in video image frames, which may be implemented by the tracking system of FIG. 4A.

Referring to FIGS. 4A-4B, a tracking system 300 and a method or technique 400 are provided tracking a subject S in successive image frames obtained by the imaging device 100 (e.g., video). The tracking system 300 may be implemented wholly or partially by the tracking system 60. It may be desirable in many circumstances to track a particular subject when recording a video, such as by locating the subject in successive image frames of the video (e.g., identifying and determining frame positions of the subject), for example, to control the imaging device 100 and/or MIA 20 to ensure that the subject S remains in the image frames. Subject tracking may be difficult, for example, with simultaneous movement of the subject and the imaging device 100 and/or by taking significant time and/or consuming significant computing resources when large amounts of video data are capture (e.g., high resolution image frames, such as 4k).

Rather than process (e.g., search) an entire image frame to locate (e.g., identify and/or determine a position of) the subject S therein, the technique 400 determines a region of interest (ROI) of the image frame to be processed. The ROI is a portion (e.g., window) of the image frame, which is smaller than the entire image frame and thereby requires less time and/or less computing resources to be processed than the entire image frame.

As shown in FIG. 4A, the tracking system 300 includes various implement the technique 400, and may also includes or be in communication with various sensors associated with the imaging device 100 and/or the subject S. The tracking system 300 and its various modules are introduced below at a high level with further description of the techniques implemented thereby discussed in still further detail below.

The modules may be included in and/or operated by various components of system 10 (e.g., the imaging device 20, the imaging device 100, the external device 50, the tracking system 60, etc.). For example, the tracking system 300 includes a module 310 (e.g., an ROI module) for determining the ROI for a particular image frame, a module 320 (e.g., an image capture module) for obtaining the imaging frame, and a module 330 (e.g., an image processing module) for processing the image frame, such as the ROI of the image frame. The tracking system 300 may also include a module 350 (e.g., a tracking control module) for controlling the imaging device 100 and/or the MIA 20.

The ROI module 310 include a module 312 for determining a visual motion estimate (e.g., a visual motion estimation module), a module 313 for determining an imaging device motion estimate (e.g., an imaging device motion estimation module, and/or a module 314 for determining a subject motion estimate (e.g., a subject motion estimation module), along with a module 315 for determining a combined motion estimate (e.g., a combined motion estimation module), and a module 316 for determining the ROI (e.g., an ROI determination module). The ROI module 310 may further include a module 317 for determining relative motion between the subject S and the imaging device (e.g., a relative motion estimation module). Various of the modules may be omitted in accordance with the technique 400 and variations thereof described below.

The visual motion estimation module 312 may receive visual information from the imaging processing module 330, such as previous positions of the subject S in previously captured image frames, from which the visual motion estimate is determined.

The imaging device motion estimation module 313 may receive motion information of the imaging device 100, or other components of the MIA 20, such as the movable platform 40 and/or the movement mechanism 30, with motion sensors 313a physically associated therewith. The motion sensors 313a associated with the imaging device 100 may include the metadata sources 144. The imaging device motion estimate is determined from information received from the sensors 313a, as discussed in further detail below.

The subject device motion estimation module 314 may receive motion information of the subject S with motion sensors 314a physically associated therewith. For example, the motion sensors 314a may be sensors of the external device 50 being held or attached to the subject S. The subject device motion estimate is determined from the information received from the sensors 314a.

The relative motion estimation module 317 may, if included, receive visual information and/or motion information from the estimation modules 312, 313, 314 and/or the sensors 313a, 314a.

The combined motion estimation module 315 receives the estimes from the estimation modules 312, 313, 314, 317 from which the combined motion estimate is determined.

The ROI determination module 316 receives the combined motion estimate from which the size and/or position of the ROI is determined.

As shown in the flowchart of FIG. 4B, the technique 400, which may be implemented by the subject tracking system 300, generally includes operations of determining 410 the ROI for an image frame $IF_t$ corresponding to a time t, obtaining 420 the image frame $IF_t$ at the time t, and processing 430 the ROI of the image frame to locate a subject S within the image frame $IF_t$, which may also include determining a size of the subject S in the image frame $IF_t$. The technique 400 may further include repeating 440 the determining 410, the obtaining 420, and the processing 430 for still further image frames $IF_{t+1}$, $IF_{t+2}$, ... $IF_{t+n}$ to be obtained at subsequent times t+1, t+2, ... t+n. The technique 400 may also include controlling 450 the imaging device 100 and/or the MIA 20 to track the subject S, for example, to maintain the subject S in subsequent image frames. For example, the controlling 450 may include controlling the location and/or orientation of the movable platform 40 (e.g., using output devices, such as a rotor), the location and/or orientation of the imaging device 100 with respect to the movable platform 40 (e.g., by operating the movement mechanism 30), and/or by controlling the imaging device 100 (e.g., with a zoom function).

The image frame for which the ROI is determined may be referred to as a subsequent image frame or a future image frame. The determining 410 of the ROI may be performed in various manners described below, for example, by the ROI module 310. The obtaining 420 of the image frame is performed, for example, by the image capture module 320 with the imaging device 100, which may be part of the MIA 20, by capturing the image frame as discussed above. The processing 430 of the $ROI_t$ is performed for the image frame $IF_t$, for example, by the image processing module 330 with the imaging device 100, the movable imaging assembly 20, the external device 50, and/or the tracking system 60 according to any suitable technique to determine the frame position $S_{POSt}$ in the image frame $IF_t$, such as by determining a centroid of the subject S.

The determining 410 of the ROI may be performed in various manners and may include determining a position of the ROI for the image frame and may further include determining a size of the ROI. For example, and as discussed in further detail below, ROI may be determined for a future image frame according to previous positions of the subject S within previously obtained image frames, motion of the imaging device 100, motion of the subject S, relative motion between the imaging device 100 and the subject S, or combinations thereof. Furthermore, the position of the ROI may be based on a position in which the subject S is predicted to be in the subsequent image frame. As used herein, the terms "frame position" or "subject frame position" refer to the position of the subject S in an image frame, which may include positions at which the subject S has been determined to be located in obtained image frames and may also include a position at which the subject S is located in an obtained image frame that has yet to be processed for locating the subject S therein.

Figure 5A:
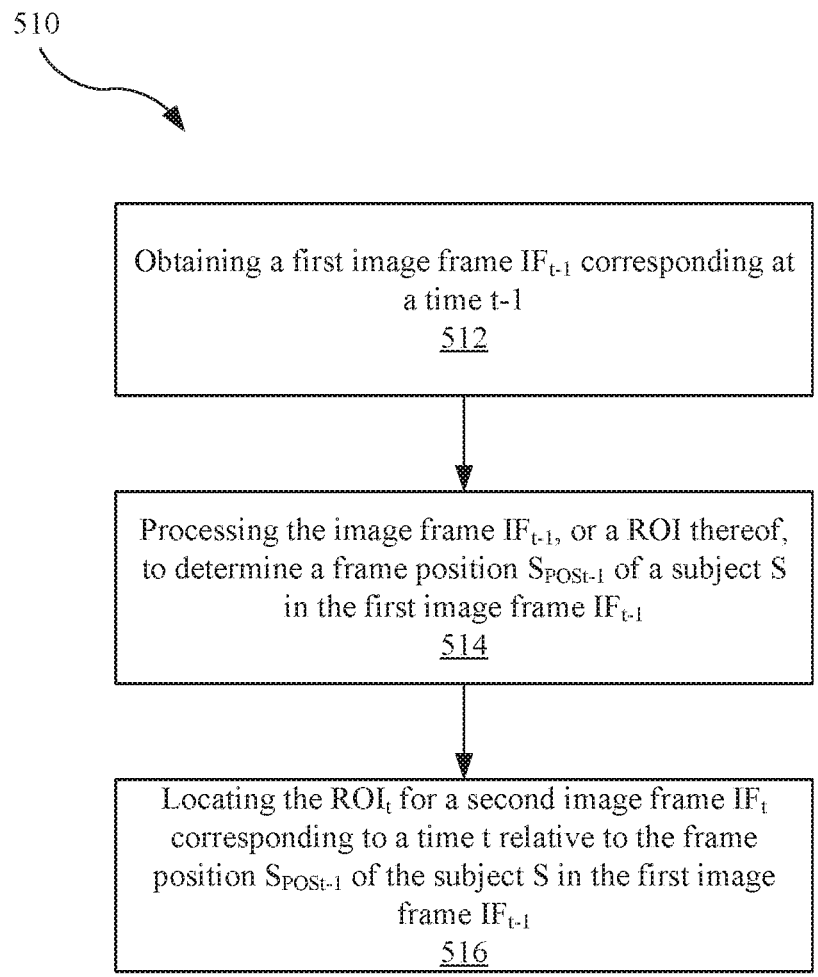
FIG. 5A is a flowchart of a technique for determining a region of interest, which may be used in the technique of FIG. 4.
Figure 5B:
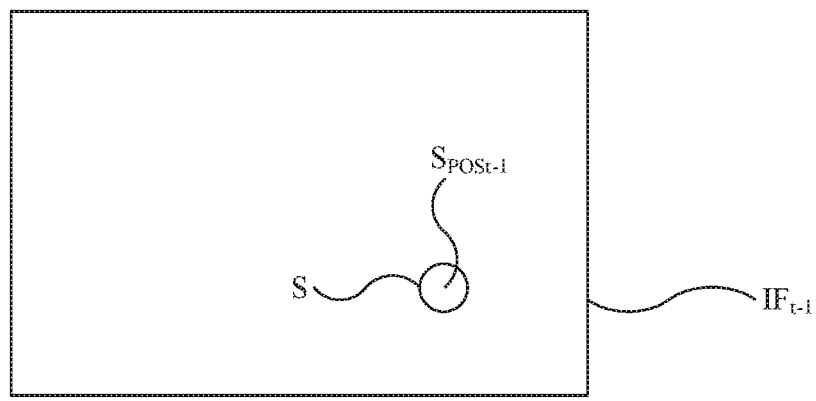
FIGS. 5B-5C are pictorial representations of video image frames that illustrate subject tracking with the technique of FIG. 5A.
Figure 5C:
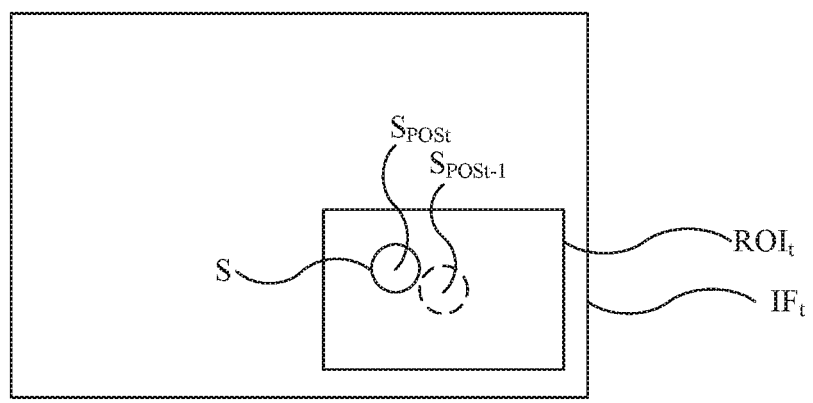

Referring to FIGS. 5A-5C, the ROI for a future image frame may be located relative to the frame position of the subject S in a previous frame. FIG. 5A is a flowchart of a technique 510 for determining the ROI, while FIGS. 5B-5C illustrate the technique 510 visually. The technique 510 presumes close proximity of the subject S in successive image frames and does not predict or estimate specific future locations at which the subject S might appear in a future image frames. The technique 510 may, for example, be implemented by the ROI module 310, including the visual motion estimation module 312 and the ROI determination module 316.

The technique 510 may be used to perform the operation for the determining 410 of the ROI in the technique 400. The technique 510 includes operations of obtaining 512 a first image frame $IF_{t-1}$ at a time t−1 (See FIG. 5B), processing 514 a first image frame $IF_{t-1}$ (or an ROI thereof) to determine a frame position $S_{POSt-1}$ of the subject S in the first frame $IF_{t-1}$ (see FIG. 5B), and locating 516 the $ROI_t$ for a second image frame $IF_t$ in a predetermined spatial relationship relative to the first frame position $S_{POSt-1}$ (see FIG. 5C). The technique 510 may be repeated as part of the technique 400 for subsequent image frames $IF_{t+1}$, $IF_{t+2}$, ..., $IF_{t+n}$. The first image frame $IF_{t-1}$ may also be referred to as a prior or previous image frame, while the second image frame $IF_t$ may be referred to as a subsequent or future image frame or a successive image frame (e.g., being obtained immediately subsequent to the first image frame $IF_{t-1}$, for example, in a video stream obtained by the imaging device 100 at a frame rate, such as 30 fps).

The obtaining 512 of the first image frame $IF_{t-1}$ may be the obtaining 420 performed in the technique 400 for an image frame from prior to the image frame $IF_t$. The processing 514 may be for an entirety of the image frame $IF_{t-1}$, or may be for an ROI thereof (e.g., as determined in a prior operation of the technique 510). The locating 516 of the $ROI_t$ may include centering the $ROI_t$ on the frame position $S_{POSt-1}$ of the subject S in the first frame $IF_{t-1}$. The $ROI_t$ may, for example, be rectangular as shown (e.g., having a common aspect ratio with the entire image frame), square, or another suitable shape.

The technique 510 may also include determining a size of the $ROI_t$. For example, the size of the $ROI_t$ may be determined according to a size of the subject S, for example, in the image frame $IF_{t-1}$, for example, increasing or decreasing in size if the subject S appears in the image frame $IF_{t-1}$ larger or smaller as compared to a previous image frame. For example, the size of the $ROI_t$ may be determined according to a predicted size of the subject S in the image frame $IF_t$. Alternatively, the size of the ROI may be a default size or may be fixed as the technique 510 is performed for successive image frames. Generally speaking, a larger $ROI_t$ results in a higher likelihood of the subject S being within the image frame $IF_t$, while a smaller $ROI_t$ results in a lesser likelihood.

Referring to FIGS. 6A-6E a technique 610 and variations thereof are provided for determining the ROI (i.e., the size and the location) relative to a predicted frame position of the subject S in the future image frame. Such techniques may be performed with various different information and/or in various different manners. Such information may include visual information obtained from previously obtained image frames, motion information of the imaging device 100, and/or motion of the subject S, which may be obtained from the previously obtained images and/or various sensors associated therewith. The term "predicted frame position" or "predicted subject frame position" refers to the position at which the subject S is estimated (e.g., predicted, estimated, likely, etc.) to appear in the subsequent image frame. In some implementations, the technique 400 may include initially performing the technique 510 to determine the ROI for one or more initial image frames (e.g., a second image frame in a video image stream), and include later performing another technique (e.g., the technique 610) to determine the ROI for later image frames (e.g., after sufficient visual and/or motion data is acquired to perform the technique 610). The technique 610 may be implemented by the ROI module 310, including the visual, imaging device, subject, relative, and/or combined motions modules 312-315, 317 and the ROI determination module 316.

Figure 6A:
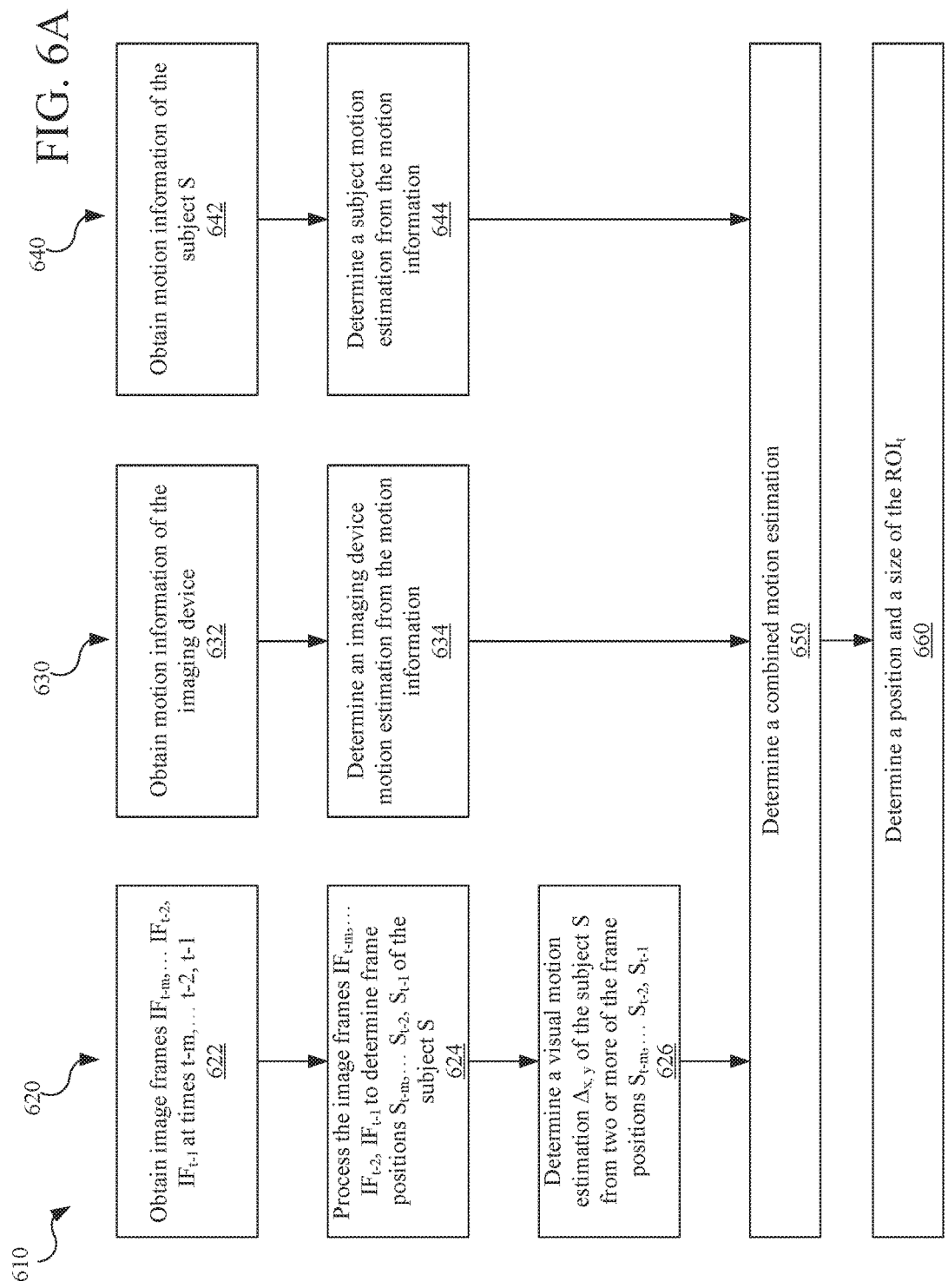
FIG. 6A is a flowchart of another technique for determining a region of interest, which may be used in the technique of FIG. 4.
Figure 6D:
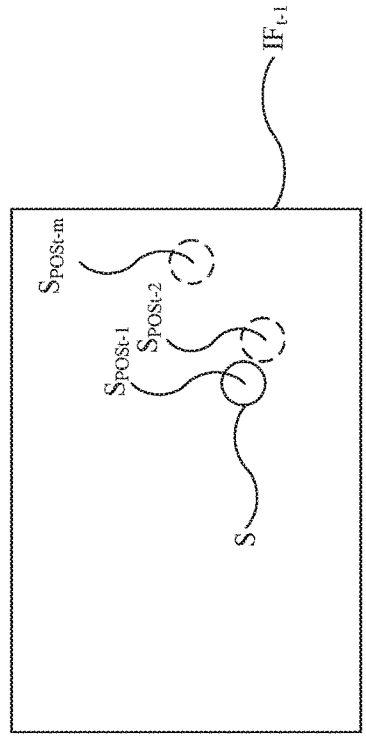
FIGS. 6B-6E are pictorial representations of video image frames that illustrate subject tracking with the technique of FIG. 6A.

FIG. 6A is a flowchart of a technique 610 for determining the ROI, while FIGS. 6B-6E illustrate the technique 610 visually. The technique 610 may be used to perform the operation for the determining 410 of the $ROI_t$ in the technique 400. The technique 610 includes operations of: determining 620 a motion estimate of the subject S according to previously obtained image frames (e.g., a visual motion estimate), determining 630 a motion estimate of the imaging device 100 in real space (e.g., an imaging device motion estimate), and determining 640 a motion estimate of the subject S in real space (e.g., a subject motion estimate). The technique 612 further includes determining 650 a motion estimate of the subject S according to the one or more of the visual motion estimate, imaging device motion estimate, and the subject motion estimate (e.g., a combined motion estimate), and determining 660 a size and location of the $ROI_t$ from the combined motion estimate. The term "real space" refers to a fixed spatial frame of reference, which may be global coordinates or another defined coordinate system. The motion estimates may, for example, be estimates for a change of position of the subject S in the image frames IF, or may be an estimate of motion of the imaging device 100 or the subject S from which estimates of the changes of position of the subject S may be derived.

The operation for the determining 620 of the visual motion estimate is, for example, performed by the visual motion estimation module 312 according to a motion model. The visual motion estimate is an estimate of a change of position of the subject S in the image frame (e.g., a change in X, Y coordinates or predicted X, Y coordinates). The motion model uses the frame positions of the subject S in two or more previously obtained image frames $IF_{t-m}, \ldots IF_{t-2}, IF_{t-1}$ and a motion model to predict motion of the subject S, for example, from the image frame $IF_{t-1}$ to the image frame $IF_t$. The determining 620 generally includes operations of obtaining 622 the image frames $IF_{t-m}, \ldots IF_{t-2}, IF_{t-1}$ (see FIGS. 6B-6D), processing 624 the image frames $IF_{t-m}, \ldots IF_{t-2}, IF_{t-1}$ to determine frame positions $S_{t-m}, \ldots S_{t-2}, S_{t-1}$ of the subject S therein (see FIGS. 6B-6D), and determining 626 a visual motion estimate $\Delta_{x,y}$ of the subject S using the frame positions $S_{t-m}, \ldots S_{t-2}, S_{t-1}$ and a motion model (see FIG. 6E).

Figure 6E:
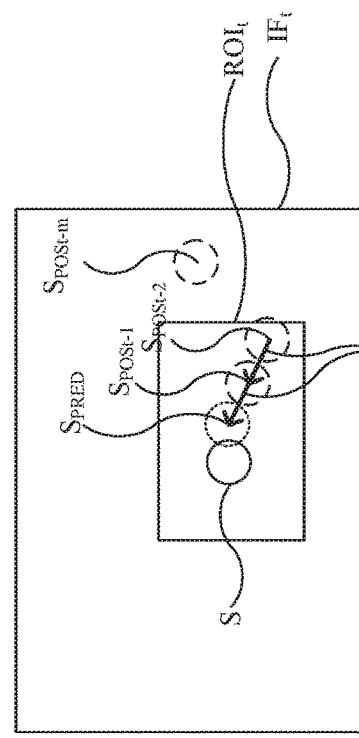
Figure 6B:
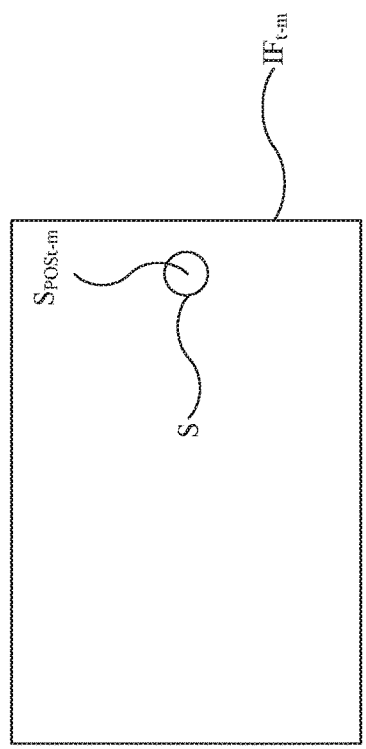
Figure 6C:
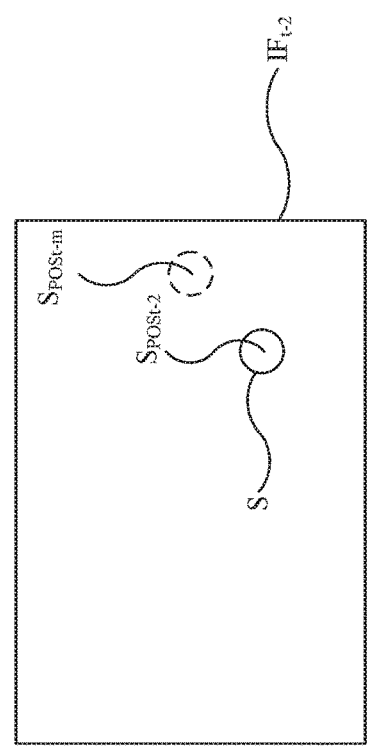

The motion model may, as illustrated in FIG. 6E, be a constant motion model that assumes constant motion of the subject S between the two most recent image frames (e.g., $IF_{t-1}$ and $IF_{t-2}$) and between the most recent image frame and the subsequent image frame (e.g., $IF_{t-1}$). For example, the constant motion may be a two-dimensional frame position change $\Delta_{x,y}$, or may be a three-dimensional frame position change $\Delta_{x,y,z}$ that additionally accounts for a distance in a direction perpendicular to the image frame (e.g., based on a change of size of the subject S in the image frames or measured distances between the subject S and the imaging device 100). Alternatively, the motion model may use more than two frame positions from previously obtained image frames (e.g., three, four, or more), which may more accurately determine the visual motion estimate by considering more information, for example, using line fitting (e.g., a linear motion model), curve fitting (e.g., a curvileinear motion model, for example, using polynomials and/or splines), or a recursive filter (e.g., an extended Kalman filter (EKF)).

The determining 620 of the visual motion estimate may further include determining a confidence value associated therewith, which may be referred to as a visual motion estimate confidence value. The confidence value is a measure of accuracy and/or certainty of visual motion estimate. The confidence value may be used in the determining 650 of the combined motion estimate, for example, to weight and/or filter the visual motion estimate among the imaging device motion estimate and the subject motion estimate.

Instead or additionally, the visual motion estimate may be, or be based on, relative motion of the imaging device 100 and the subject S as derived from the successive images. This may be referred to as a relative motion estimate, which may be determined by the relative motion estimation module 317. For example, direction and distance measurements (e.g., a vector) of the imaging device 100 and the subject S may calculated from the frame positions of the subject S in previous image frames and from a focal distance associated therewith (or other measure of distance between the subject S and the imaging device 100), and changes therein. A motion model (e.g., line or curve fitting model) may be applied to the previous direction and distance measurements to predict future relative motion of the imaging device 100 and the subject S from which the visual motion estimate may be derived.

Instead or additionally, the visual motion may be based on motion vectors created during video processing (e.g., encoding and/or compression techniques). When the image frames are encoded using certain video encoding techniques, such as H.264 (MPEG-4 Part 10, Advanced Video Coding), the encoding utilizes motion vectors created by the video encoder between the last and the current video image frames. These motion vectors may be utilized to predict or refine the visual motion estimate.

The operation for the determining 630 of the imaging device motion estimate is, for example, performed by the subject motion estimation module 313 according to motion information of the imaging device 100. The imaging device motion estimate is an estimate of motion of the imaging device 100 in real space, for example, from time t−1 to t. Alternatively, the imaging device motion estimate may be an estimate of motion of the subject S between the image frame $IF_{t-1}$ and the image frame $IF_t$ due to motion of the imaging device 100 in real space. The determining 630 of the imaging device motion estimate generally includes operations of obtaining 632 motion information of the imaging device 100, and determining 634 the imaging device motion estimate from the motion information.

The motion information of the imaging device 100 may include orientation information and position information. The motion information may also be referred to as egomotion. Orientation information may, for example, include roll, pitch, yaw, and higher order terms thereof, such as rotational velocity and/or rotational acceleration. Position information may, for example, include horizontal coordinates (e.g., global positioning or Euclidean coordinates), elevation, and higher order terms thereof, such as translational velocity and/or acceleration.

Orientation information and position information may be obtained from the various sensors 313*a* physically associated with the imaging device 100, such as the metadata sources 144. The various sensors may be coupled to the imaging device 100 itself, or may be coupled to other components of the MIA 20, such as the movable platform 40 and the imaging device movement mechanism 30. In one example, the imaging device 100 includes an embedded gyroscope, which includes one or more gyroscopes to detect rotation of the imaging device 100 in multiple axes relative to real space (e.g., the roll, pitch, and yaw). In another example, the MIA 20, or the movable platform 40 thereof, may include a global positioning system, a gyroscope, accelerometers, a barometer, a compass, an altimeter, a barometer, a magnetometer, an optical flow sensor, and/or an IMU (which may include one or more of the aforementioned sensors) from which the motion information (e.g., orientation and/or position, or changes therein) of the movable platform 40 may be determined in real space. The movement mechanism 30 may additionally include position sensors, which measure the motion information (e.g., orientation and/or position, or changes therein) of the imaging device 100 relative to the movable platform 40. Thus, from motion information of the movable platform 40 and of the movement mechanism 30, motion information of the imaging device 100 may be determined.

Still further, motion information of the imaging device 100 in real space may be obtained from the previously obtained image frames $IF_{t-m}, \ldots, IF_{t-2}, IF_{t-1}$. For example, the position and/or orientation of the imaging device 100 (e.g., the MIA 20) may be obtained by observing changes in the frame position and/or size of references points fixed in real space (e.g., features of the terrain which the subject S may move relative to).

The determining 630 of the imaging device motion estimate may further include determining a confidence value associated therewith, which may be referred to as an imaging device motion estimate confidence value. The confidence value is a measure of accuracy and/or certainty of the of imaging device motion estimate, which may, for example, be based on the reliability of the motion information (e.g., time delay and/or frequency relative to the time between successive image frames, accuracy of the sensors, availability and/or operation of the sensors, etc.). The confidence value may be used in the determining 650 of the combined motion estimate, for example, to weight and/or filter the subject motion estimate among the imaging device motion estimate and the subject motion estimate.

The operation for the determining 640 of the subject motion estimate is, for example, performed by the subject motion estimation module 314 according to motion information of the subject S. The subject estimation is an estimate of motion of the subject S in real space and/or relative to the imaging device 100, for example, from time t−1 to t. Alternatively, the subject motion estimate may be an estimate of motion of the subject S between the image frame $IF_{t-1}$ and the image frame $IF_t$ due to motion of the subject S in real space and/or relative motion of the subject S to the imaging device 100. The determining 640 of the subject motion estimate generally includes operations of obtaining 642 motion information of the subject S, and determining 644 the subject motion estimate from the motion information of the subject S.

The motion information of the subject S may include position information. The position information may, for example, include coordinates (e.g., global positioning or Euclidean coordinates) and/or elevation of the subject S in real space, and higher order terms thereof, such as translational velocity and/or acceleration. The position information may instead or additionally include relative positional information between the subject S and the imaging device 100, such as a distance therebetween and/or directional information (e.g., a vector).

Position information may be obtained from various sensors 314*a* and/or transmitters physically associated with the subject S. For example, a beacon device, such as the external device 50, a smartphone, accelerometers, a dedicated beacon device, or the beacon schema described below, may be carried by, coupled to, or otherwise physically associated with the subject S. The sensors and/or transmitters may be used to determine the position, velocity, and/or acceleration of the subject S in real space (e.g., as with a global positioning system and/or accelerometers).

The determining 640 of the subject motion estimate may further include determining a confidence value associated therewith, which may be referred to as subject motion estimate confidence value. The confidence value is a measure of accuracy and/or certainty of the subject motion estimate, which may, for example, be based on the reliability of the motion information (e.g., time delay and/or frequency relative to the time between successive image frames, accuracy of the sensors, etc.). The confidence value may be used in the determining 650 of the combined motion estimate, for example, to weight and/or filter the subject motion estimate among the imaging device motion estimate and the subject motion estimate.

Instead or additionally, the subject motion estimate may be a measure of relative movement between the subject S and the imaging device 100. This may also be referred to as a relative motion estimate, which may be determined by the relative motion estimation module 317. For example, the imaging device 100, the MIA 20, and/or the subject S may include sensors 313*a*, 314*a* by which distance and direction may be measured. For example, the imaging device 100 and/or the MIA 20 may include sensors (e.g., ultrasonic transceivers) that send and receive signals by which a distance and changes in distance (e.g., direction) may be measured between the imaging device 100 and the subject S. Similarly, the subject S may include a transmitter (e.g., beacon) that sends signals by which a distance and changes in distance (e.g., direction) may be measured (e.g., based on the time between sending and receiving the signal).

The operation for the determining 650 of the combined motion estimate is, for example, performed by the combined motion estimation module 315 according to the visual frame motion estimate, the imaging device motion estimate, and/or the subject motion estimate. The combined motion estimate is an estimate of the movement that the subject S will undergo from the image frame $IF_{t-1}$ to the future image frame $IF_t$, or may be the predicted frame position SPRED of the subject S in the image frame $IF_t$. The visual frame estimation, the imaging device motion estimate, and/or the subject motion estimate are combined (e.g., fused) to determine the combined motion estimate. As referenced above, confidence values associated with each of the visual frame motion estimate, the imaging device motion estimate, and the subject motion estimate may be used, for example, to weight and/or filter each such estimation in determining the combined motion estimate. For example, the imaging device motion estimate, the subject motion estimate, and/or the relative motion estimate may be used to account for motion of the imaging device and the subject S (e.g., egomotion) by accounted for in the visual motion estimate. For example, the imaging device motion estimate, the subject motion estimate, and/or the relative motion estimate may be determined as expected frame motion (i.e., a change of position of the subject S in the image frame) and be added (e.g., in weighted or unweighted form) to the visual motion estimate. By combining the various motion estimates, the $ROI_t$ the predicted frame location SPRED may be more accurate, thereby allowing the $ROI_t$ to be sized smaller to provide reduced computing time and/or reduced computing resources for tracking the subject S in successive image frames.

The operation for the determining 660 of the size and the location of the $ROI_t$ is, for example, performed by the ROI determination module 316 and includes determining a predicted frame location SPRED of the subject S in the image frame $IF_t$ and locating the $ROI_t$ relative to the predicted frame location SPRED (e.g., in a predetermined location, such as centered on thereon).

The determining 660 also includes determining the size of the $ROI_t$, which may include increasing or decreasing a size of the $ROI_t$ as compared to a previous $ROI_{t-1}$. The size of the $ROI_t$ may be increased, for example, if the combined motion estimate indicates the imaging device 100 will be closer to the subject S, which would be expected to appear larger in the image frame $IF_t$ and possibly require processing a larger portion of the image frame $IF_t$ to locate the subject S therein. The size of the $ROI_t$ may also be increased, for example, in circumstances in which the predicted location SPRED may be less reliable, for example, with faster movements (e.g., relatively large change between the predicted frame position SPRED and the previous frame position $S_{POSt-1}$) and/or relatively low confidence values being associated with each of the visual frame motion estimate, imaging device motion estimate, and/or the subject motion estimate. Alternatively, the $ROI_t$ may sized to a default size or may not change in size for different image frames IF (e.g., have a fixed size, such as ¼, ⅛, or 1/16 of a total size of the image frames).

Variations of the techniques 400, 510, and 610 are contemplated. For example, in the technique 610, the determining 650 of the combined motion estimate may be omitted, and the determining 660 of the $ROI_t$ may be performed directly with the visual motion estimate, the imaging device motion estimate, and/or the subject motion estimate. Furthermore, one or more of the operations for the determining 626, 634, and 644 of the various motion estimates may be omitted with the operation for the determining 650 the combined motion estimate or the operation for the determining 660 of the ROI being performed with the image frames and/or motion information from the operations of obtaining 622, 632, 642.

One or more of the modules 310-317, 320, 330 and the techniques 400, 510, and 610 can be performed and/or implemented, for example, by executing a machine-readable program or other computer-executable instructions, such as instructions or programs described according to JavaScript, C, or other such instructions. The steps, or operations, of the modules or techniques, or any other technique, method, process, or algorithm described in connection with the implementations disclosed herein can be implemented directly in hardware, firmware, software executed by hardware, circuitry, or a combination thereof, for example, of the MIA 20, the imaging device 100, the external device 50, and/or the tracking system 60.

Trajectory Generation for Subject Tracking

Degrees of Freedom

Once a subject or a target has been determined as present in a video stream as captured by an aerial subject tracking system or MIA 20, it is desirable to automatically or semi-automatically accurately frame the subject within the video image frames. For stationary targets, a manual framing may not be too difficult, once a manual control of the movable platform 40 has been mastered. However, moving targets can present a much more complex scenario, and a specific control becomes much more difficult.

According to an implementation, an automatic or semi-automatic control of the MIA 20 can be effected to operate within certain constraints. According to a first constraint, and referring to FIGS. 7A and 7B, which are pictorial illustrations of the MIA 20 and the MIA's imaging device 100 with respect to a target T, when the target T moves, a motion of the MIA 20 can be defined as having the MIA 20 follow the target T with a constant delta in altitude (e.g., vertical) and horizontal position with respect to the target T. A constant delta in the horizontal position can mean: a) the horizontal position of the target T is fixed within the video image frames, that is, the MIA 20 moves as the target T changes direction of travel (e.g., the MIA 20 will remain behind the target, and adapt automatically to changes in direction of travel); or b) the horizontal position of the target T is fixed in a GPS frame, meaning the MIA 20 position is fixed irrespective of a direction of travel of target T. The motion of the MIA 20 may be described as relative to a frame of reference (FOR) that is either a target T or a fixed GPS framework.

A user may provide input to the MIA 20 via an external device 50 such as the MIA controller and UI described in respect to FIG. 1. This may allow control of, or selection of, e.g., five DOFs, three of which are related to control of the movable platform 40 relative to the target, and two of which are related to orientation of the imaging device 100 with respect to the movable platform 40.

Figure 7B:
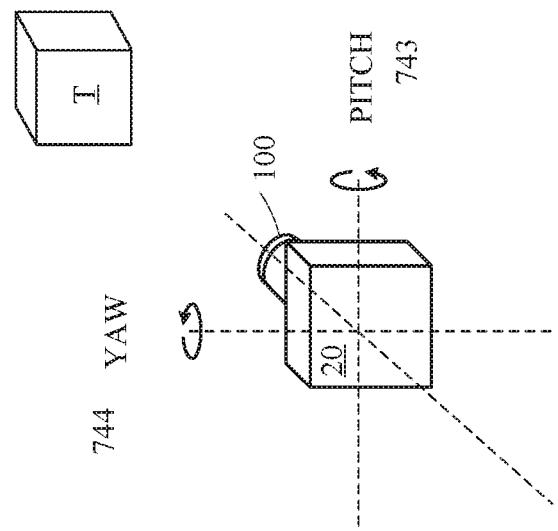
FIGS. 7A and 7B are pictorial illustrations of an imaging device positioned with respect to a target.
Figure 7A:
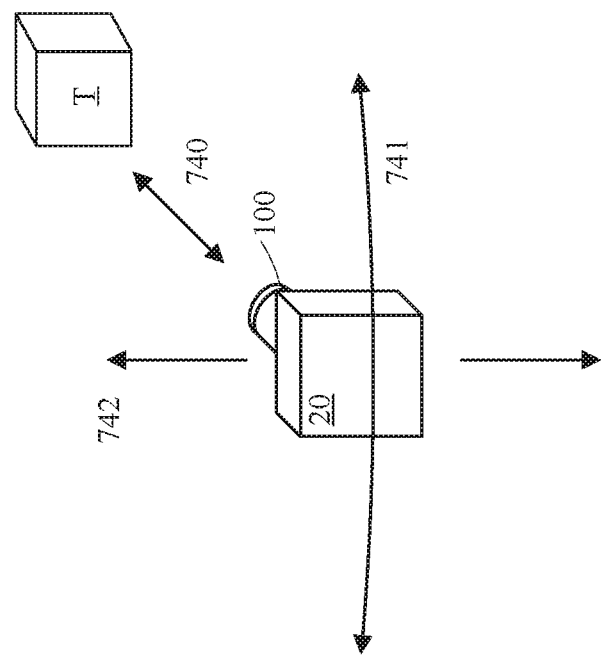

As illustrated in FIG. 7A, according to an implementation, the MIA 20 can be set to operate according to: a) a first DOF 740 in which the MIA 20 moves in a radial direction towards or away from the target T; b) a second DOF 741 in which the MIA 20 moves in a tangential direction, i.e., along a circular trajectory around target; and c) a third DOF 742 in which the MIA 20 moves in a vertical direction or in altitude relative to the target T.

As illustrated in FIG. 7B, and according to an implementation, the imaging device 100 can be rotated by use of, e.g., the imaging device movement mechanism 30, such as a gimbal, to allow adjustment of the imaging device 100 within the MIA 20. The user input via the external device 50 can thus be set to operate according to: d) a fourth DOF 743 in which the horizontal position of the target T may be adjusted within the video stream by, e.g., pitching the imaging device movement mechanism 30; and e) a fifth DOF 744 in which the vertical position of target T within camera stream may be adjusted by yawing the imaging device movement mechanism 30 and/or the MIA 20.

By combining operations of all five DOFs 740, 742, 744, 746, 748 discussed above, the MIA 20 and the imaging device 100 can automatically adjust position and orientation together with pitch and heading angle of the imaging device movement mechanism 30. This may ensure the correct placement of the target T or subject within the image as well as the correct relative position of the MIA 20 with respect to the target T or subject.

These DOFs 740, 742, 744, 746, 748 and constraints can be operated individually or in combination and may be choreographed over time to produce complex motion of the imaging device 100 relative to the target T. For example, for a first period of time, motion may be constrained to operating solely within the second DOF 741, but then for a second period of time, combined constraints of the first DOF 740, the third DOF 742, and fourth DOF 743 may be used in order to produce choreographed cinematic type video of the target T. The constraints may be implemented using tracking techniques defined herein.

Flight Restriction Volumes

It may be desirable to create certain flight restriction volumes or zones in order ensure the safety of the user and at the same time ensure that the tracking system associated with the MIA 20 continues to function robustly. To that end, regardless of other MIA 20 motion trajectories or constraints, a further delineation of allowable and non-allowable volumes relative to a target may be defined within which flight is permitted or not permitted, respectively. These allowable and non-allowable volumes may override other calculations of trajectories for the MIA 20 in order to maintain safety of persons or property (including the MIA 20), or to ensure that the subject S remains within view of the imaging device 100.

Figure 7C:
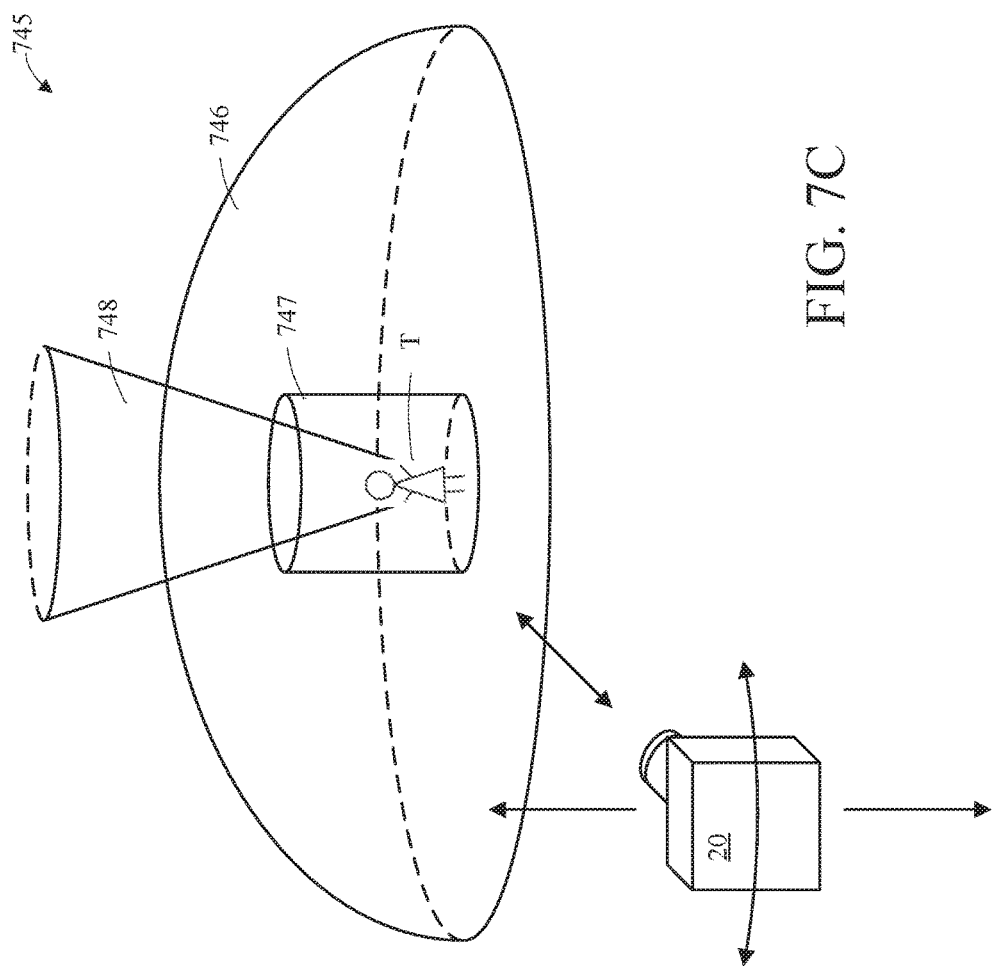
FIG. 7C is a pictorial perspective view of the MIA of FIG. 2A operating within predefined volumes.

FIG. 7C is a pictorial perspective view of the MIA 20 operating within predefined volumes 745. A first volume 746 may be defined as an outermost boundary within which the MIA 20 may operate. In one implementation, this first volume 746 could be, e.g., a half-sphere (or approximation thereof) whose surface constitutes a predefined maximum allowable distance to the target T to ensure that the tracking system does not lose the target T. This first volume 746 could also include a boundary that ensures that a distance between the MIA 20 and the external device 50 or the subject S (e.g., when using a GPS position of the subject), when a direct wireless link exists, does not exceed a maximum range of the wireless connection. The maximum range can be variable and can be a function of the number of other devices operating within a same Wi-Fi frequency spectrum or may be based on other factors that can impact transmission distances. A margin of safety may be applied to any of the volumes, surfaces, or surface point distances discussed herein. Other constraints may also be incorporated into the definition of the first volume 746, such as no-fly zones, etc.

A second volume 747 may be defined by, e.g., a cylinder, whose surface represents a minimum distance to the target T and within which constitutes a no-fly zone around the subject to ensure the safety of the subject. Finally, a third volume 748 may be defined that takes into account a maximum extent of pitch permitted for the imaging device 100 with respect to the MIA 20 in order to ensure that the tracking system does not lose the target T. This third volume 748 may be defined as a cone, and operation of the MIA 20 within this cone may be avoided.

These volumes 746, 747, 748 may also be designed to take into consideration motion of the target T in the image caused by the motion of the MIA 20. This motion may be kept within certain predefined limits to ensure proper operation of the tracking system. In other words, changes in speed and direction of the MIA 20 may be constrained to occur below a certain change rate if the MIA 20 is operating in a mode where it tracks the target T. If a motion estimate of the target T is available, this information may be incorporated to reduce the maximal allowed motion.

If a trajectory of the MIA 20 established by other criteria would cause the MIA 20 to enter a non-allowed volume, the trajectory may be modified so that it remains within an allowed volume. For example, the trajectory of the MIA 20 may be modified to include a point within the allowed volume nearest a point of the original trajectory that was within a non-allowed volume.

Scene Composition and Framing Preservation

Cinematography benefits significantly from utilizing composition and framing techniques that have been historically developed. Such techniques can be applied with regard to the images and video obtained by use of the MIA 20. This introduces greater complexity than simply identifying and keeping track of a single subject or target T, as it may involve cinematic framing and trajectory by defining, identifying, and/or detecting a subject, multiple subjects and/or a scene and/or a cinematic element such as a backlight, horizon, or other compositional aspects. The following techniques may be applied to the system.

First, consideration may be given to placement of a target T within a particular scene. Determining which features form parts of the scene can be useful so that the target T can be in front of the scene and preferably not obscured by parts of the scene during movement. Backlight may be considered to be in front of the scene and behind subject(s), and the maintenance of backlight (or any other particular form of lighting) can be set as a parameter constraining motion. Fixtures or stationary objects may be considered as located in a fixed place throughout a scene whereas subjects may be considered as dynamic actors within a scene.

FIG. 8 is a pictorial representation of a video image frame 630*d* that illustrates an application of the rule of thirds, which is splitting a frame into a three by three grid that defines ideal placement for various elements within the frame as shown. The imaging device 100 may be positioned to maintain the horizon at an upper third position within the frame 630*d*, here, along a topmost horizontal grid line, and the target T within the left third of the frame 630*d*. In other applications of the rule of thirds, the horizon may be locked along the other of the horizontal grid lines and the target T can be captured so as to be located near various intersections of horizontal and vertical grid lines.

Other known compositional techniques may be further applied, such as the golden ratio, use of diagonals, element balancing, leading lines, symmetry and patterns, and use of negative space, and/or other techniques. A composition can ensure that there is adequate headroom for the subject, i.e., that the subject is framed such that ratios between subject features, top of subject, and top of frame form a reasonable ratio. Ratios may be sustained as the subject moves through the frame and as the imaging device 100 moves, for example, within or along with the MIA 20. Furthermore, a composition can ensure that there is adequate lead room, i.e., adequate space in front of a subject's motion or subject's heading.

All of the compositional techniques may be stored in a library along with algorithms and/or parameters used to define and implement the techniques. One or more of these compositional techniques by be selectable and operable simultaneously.

Any of the techniques described above for determining motion of the imaging device 100 or predicting or restraining motion of the subject S (or the target T) may be applied to creating and maintaining the compositional features described above. By way of example only, applying the constraints as described above with respect to FIGS. 7A and B may be utilized to create these specific compositional features.

Voice Command Tracking

When using visual tracking in a dynamic scenario (e.g., during action sports), the operator of the MIA 20 may not have the time or may not wish to control the subject tracking via physical (e.g., "hands-on") operation of the external device 50. This may occur in scenarios where an operator of a tracking system 60 is also the target T that is being tracked.

FIG. 9 is a block diagram of an implementation of a voice recognition system 70 that may be utilized to perform the desired subject tracking without requiring, or by reducing, an amount of operator physical interaction with the external device 50. According to an implementation, the operator of the MIA 20 may carry or wear a microphone 710 connected to a voice recognition unit 720 that interprets audio or voice commands 725 from the operator and relays valid tracking commands 727 obtained from a command database 730 to the tracking system 60 of FIG. 1. The voice recognition unit 720 may comprise a speech-to-text converter unit. A searching algorithm can locate commands associated with the converted text in the command database 730 containing valid commands.

Using the voice commands 750, the operator may direct the MIA 20 to execute a wide variety of scripted flight maneuvers, which may be referred to herein as "ProMoves," and execute control over the MIA 20. Basic control commands, such as "startup," "shutdown," or "stop," may be executed using the voice commands 750. ProMoves related to the various forms discussed above may also be executed. In an example where the voice command 750 includes "execute orbit at five meters altitude above the target T or a point of interest (POI) with a ten meter radius," the tracking system 60 may instruct the MIA 20 to move to a height of five meters above the target T and then continuously move tangentially about the target T at a distance of ten meters. The voice command 750 may also instruct the MIA 20 to be positioned at an altitude five meters above the ground or to operate a "dronie" ProMove where the MIA 20 is directed to point at the target T or the POI and then fly backwards/upwards, etc.

A variety of measurement units may be utilized. For example, the units of feet and meters may be mixed together in a single command, and the voice recognition unit 720 or the tracking system 60 could convert the mixed units to a standardized set of units accordingly. Also, specifics as to a number of repeated operations could be received as part of the voice command 750, such as "execute orbit twice." In the event insufficient parameters are supplied to generate a complete command (e.g., the "ten meter radius" was omitted from the above voice command 750), the operator could either be voice prompted for the additional information and/or some predefined default value could be used.

Absolute distances may be used in the voice commands 750 (e.g., "execute orbit at five meters") as well as relative distances (e.g., "execute orbit five meters higher"). In the event that a direction of travel or the orientation of the subject is available, the operator may also give voice commands 750 that take this information into account. For example, the voice command 750 can include language such as "take a shot from my right side". The above voice commands 750 are presented as examples, but do not constitute a comprehensive list of voice commands 750.

Figure 10:
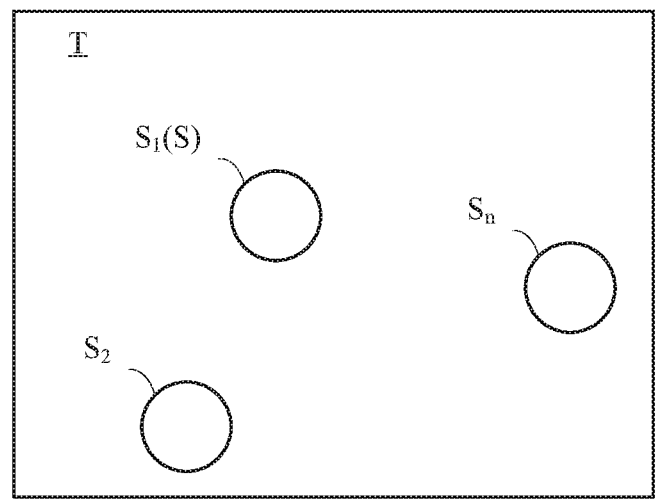
FIG. 10 is a pictorial diagram of a target T comprising a plurality of selectable subjects.

FIG. 10 is a pictorial diagram of a target T comprising a plurality of selectable subjects $S_1$-$S_n$ for use in describing implementation examples for the voice recognition system 70 of FIG. 9. In addition to focusing on a single subject S as a target T, the voice commands 750 sent to the voice recognition system 70 may specify a collection of subjects $S_1$-$S_n$ as the target T. The voice commands 750 may also be used to switch focus between several subjects $S_1$-$S_n$.

The specifying of subject(s) S as targets T may be performed in at least two ways: teaching and object recognition. In a first way (teaching), before a shot is taken, a teach-in phase is used where each subject $S_1$-$S_n$ is assigned a unique ID. Object recognition algorithms may be utilized to associate the subject S with its assigned ID. Then, in an operational phase, the operator may switch the focus of the tracking system 60 during the shots to different subjects $S_1$-$S_n$ using the voice commands 750, such as "switch focus to subject $S_1$." During the teach-in phase, instead of assigning unique IDs, actual names could be assigned to the subjects $S_1$-$S_n$ to make operation simpler for the operator (e.g., "switch focus to Alex").

In a second way (object recognition), visual cues about objects may be used to select the subject(s) $S_1$-$S_n$. Object attributes such as color may be used ("switch focus to the person in the red shirt"). Object attributes such as position ("switch focus to the object in the lower left-hand of the screen") and shape may also be used, and these various object attributes may also be used in combination ("switch focus to the person with long, straight, brown hair").

In one example, the user may utilize the voice commands 750 within a planned or scripted shot or scene that may be planned out in advance using, e.g., software planning tools, so that cues may be given to move through the shot. An example shot might be one that statically frames two subjects $S_1$, $S_2$, then follows subject $S_1$ for ten seconds, then follows subject $S_2$ for five seconds, then pans out to frame both subjects $S_1$, $S_2$ with a horizon and other background elements of the scene. Such cinematic control could thus be integrated as part of the voice recognition system 70, and the composition of the shot may be controlled with commands such as: "places," "action," "next scene," (another) "next scene," "cut," "take it from the top," "take it from 'pan out.'" In this way, it is possible to create relatively sophisticated videos without requiring a high degree of physical interaction with the external device 50.

The types of control discussed above may be applied even when a controllable UAV is not used as part of the MIA 20. For example, when the imaging device 100 is connected to the imaging device movement mechanism 30, such as the gimbal mechanism discussed above, but there is no movable platform 40 or it is not one that is remotely controllable (e.g., a downhill skier uses the imaging device 100 with the movement mechanism 30 mounted to the skier's helmet or handheld by the skier), various types of the voice commands 750, such as subject selection and the like may still be utilized.

Ultra-Wide-Band Localization Using a Beacon Schema

A GPS device may be mounted to the MIA 20 and to the target T. The absolute positions of each may be read from the GPS devices and then a relative position between the two may be determined. However, the accuracy of GPS devices, particularly in measuring altitude, is generally limited and not sufficient to allow precise subject tracking control. It is desirable, when performing aerial subject tracking, to accurately know the position of the target T with respect to the MIA 20. The use of GPS beacons, i.e., devices that use GPS satellites to determine position and then broadcast that position to other GPS beacons, may be applied in the context of aerial subject tracking.

FIG. 11 is a pictorial representation of an implementation of the MIA 20 tracking a target T. In order to improve the accuracy in measuring a distance between the target T and the MIA 20, the system illustrated in FIG. 11 may utilize a set of ultra-wide-band transceivers (UWBTs) 800a-800d (collectively or representatively, 800) to directly estimate a relative position and velocity of the target T with respect to the MIA 20. This may be done by distributing UWBTs between the MIA 20 and the moving target T, for example, by affixing three or more UWBTs 800a-800c with a known position (with respect to the MIA 20) on the MIA 20. Additionally, in this implementation, the target T has one additional UWBT 800d affixed to it.

This implementation presents a low-cost approach to create a local relative position measurement system that can determine a distance between the MIA 20 and the movable target T having considerable accuracy. The accurately determined distance can then be provided to the tracking system 60. Rather than using the UWBTs 800 in static scenarios where a set of anchor UWBTs are distributed on the ground, the UWBTs 800 are positioned such that all are movable with respect to a fixed-frame (e.g., earth-based) reference coordinate system. Thus, this implementation performs subject tracking without requiring the use of static beacons. Static beacons may take time (and effort, in difficult environments) to place, set up, initialize, and/or configure, and the use of the MIA 20 may be restricted to locations close to where the static beacons are placed. A device that determines and analyzes positions calculated from the UWBTs can be located on the MIA 20 or the target T.

To perform subject tracking in this implementation, a distance between the UWBT 800d on the target T and each of the UWBTs 800a-800c anchored on the MIA 20 may be measured by a known time-of-arrival approach. Once the individual distances are known, a relative position of the target T may be derived using, e.g., known sphere intersection techniques for four or more UWBTs 800a-800d serving as anchors or known triangulation techniques (when only three UWBTs 800a-800c serve as anchors).

By employing phase shift approaches, a relative direction of the target T with respect to the MIA 20 may be derived. This becomes more useful once a position estimate degrades due to conditioning issues (e.g., a small anchor baseline relative to the subject-UAV distance). By fixing an inertial measurement unit on one or more of the UWBTs 800a-800c of the MIA 20 and/or the UWBT 800d on the target T, relative position estimates may be improved. In addition, relative velocity estimates may be improved, both in terms of relative positions (between the target T and the MIA 20) and absolute positions (with respect to an earth framework).

Improvements in relative position and velocity estimates may be advantageous since the high-level output of the system may be noisy position measurements and/or a relative range between beacons. By fusing this output with gyroscope and accelerometer data in a sensor fusion framework, the system may be able to: a) increase frequency (internal measurement unit (IMU) data may be higher frequency than UWB measurements); b) reduce noise in position estimates; c) obtain accurate velocity information (by fusion of position and acceleration (which is a second derivative of position)); and d) reduce a delay in a position estimate by synchronizing a time between IMU measurements (very low latency) and UWBT measurements such that any delay in providing the UWBT measurements may be eliminated.

System Architecture and Dataflow: Latency and Synchronization

As described with respect to FIG. 1, the MIA 20 may include the imaging device 100, such as a camera, which may be mounted to the movable platform 40, such as a drone, via an imaging device movement mechanism 30, such as a gimbal as described above. The movement mechanism 30 can also provide for active stabilization of the imaging device 100, and/or the captured images themselves can be stabilized using image shake correction techniques. The external device 50, such as the MIA controller and user interface discussed above, may be utilized for controlling the MIA 20.

Figure 12A:
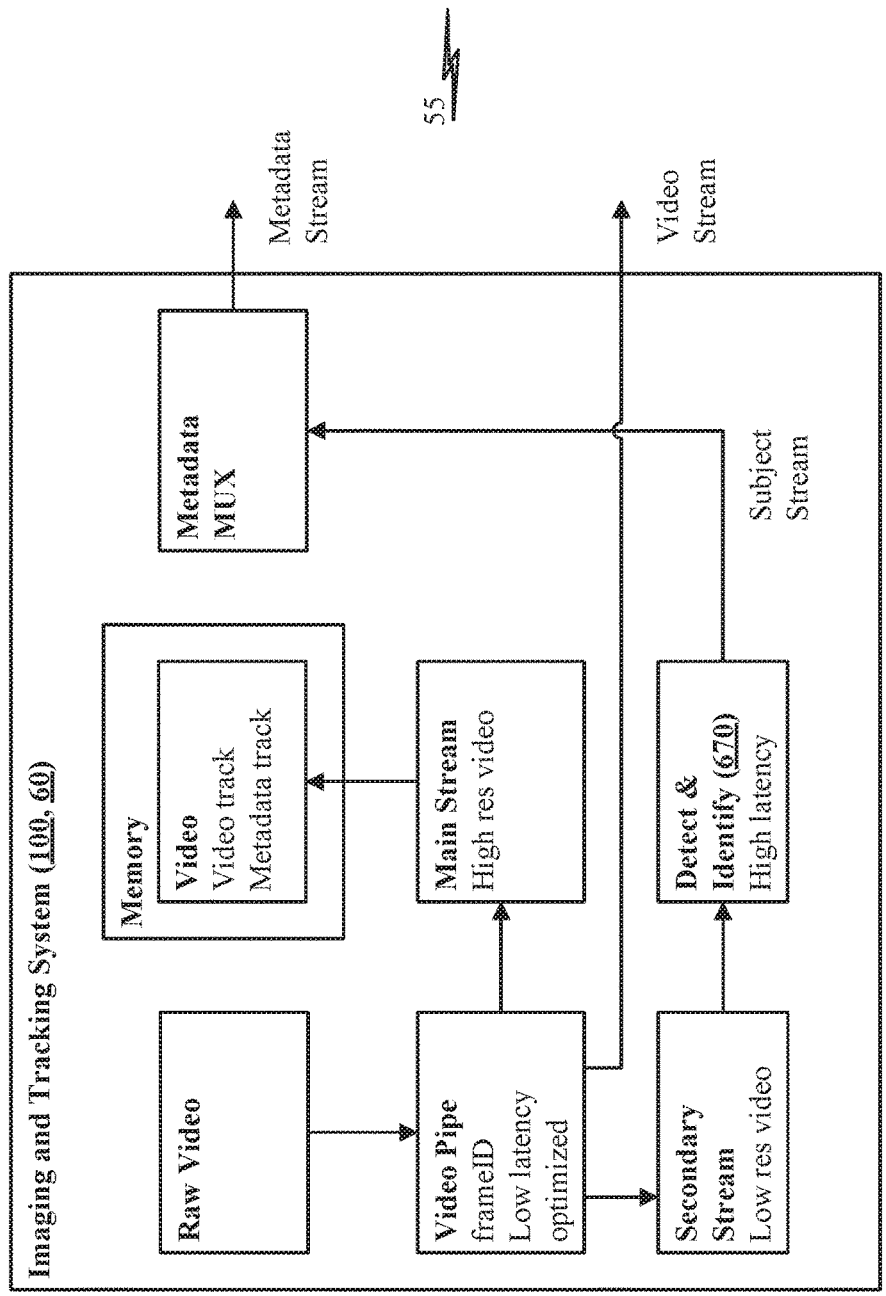
FIG. 12A is a block diagram of various modules of a combined imaging and tracking system, according to an implementation.

FIG. 12A is a block diagram of various modules of a combined imaging and tracking system 100, 60 according to an implementation. In order to perform subject following, algorithms of the tracking system 60 such as a detect and/or identify module 670 may be run on the imaging device 100 or the MIA 20. A video stream and a metadata stream comprising the subject stream may be provided as outputs to the link 55.

The processor on the imaging device 100 may be less powerful, due to size and power constraints, than the processor on the external device 50. In cases where the processors on the imaging device 100 and the external device 50 have similar power levels, the processor on the imaging device 100 may be performing its primary task of image capture, leaving little processing power for other tasks, such as tracking. Thus, running the tracking system 60 on the imaging device 100 may be relatively slow, introducing additional delay between the video stream and the bounding box stream. In order to reduce the delay when displaying the video stream to the user (with the bounding boxes around the subject or using other metadata) on the display device 52 of the external device 50, the tracking and/or detection algorithms may be rerun on the external device 50 that is displaying the video stream to the user, the external device 50 having a more powerful processor.

Since a framerate of a video stream from the imaging device 100 may be higher than a framerate of the tracking system output (due to the high CPU load of the tracking system 60), the output of the tracking system 60 (which may be, e.g., the bounding box around the subject S, but can include any metadata associated with the video data) can be disjointed and have a stuttering look and feel to the user.

In order to smooth the appearance of motion of the bounding box, motion interpolation techniques that are applied to the subject S or the target T and the MIA 20 discussed above can also be applied to the motion of the bounding box associated with the tracking system 60. This interpolation may be done by using a motion model based on a previous location of the bounding box. The motion model can be based on fitting a curve (polynomial, spline), a recursive filter (such as an EKF), or some other method, as described above.

Output from the tracking algorithm running on the imaging device 100 may be sent to the MIA 20 to be used for the actual tracking of the subject S or the target T. The video stream from the imaging device 100 may simultaneously be sent to the external device 50, and this video stream may then be used for the display system 51 of the external device 50. This arrangement reduces a delay that may be introduced by running the tracking and/or detection algorithms on the imaging device 100.

Figure 12B:
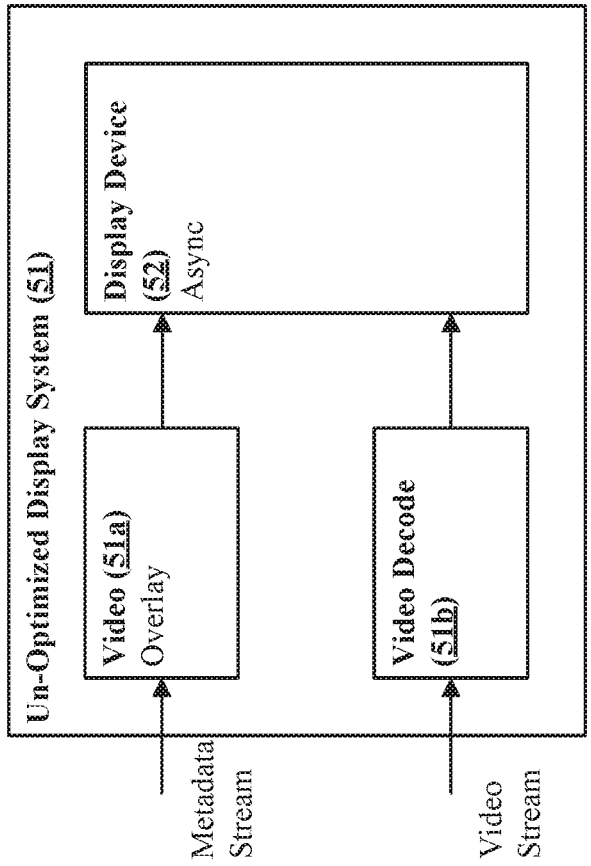
FIG. 12B is a block diagram of various modules of an un-optimized display system, according to an implementation.
Figure 12C:
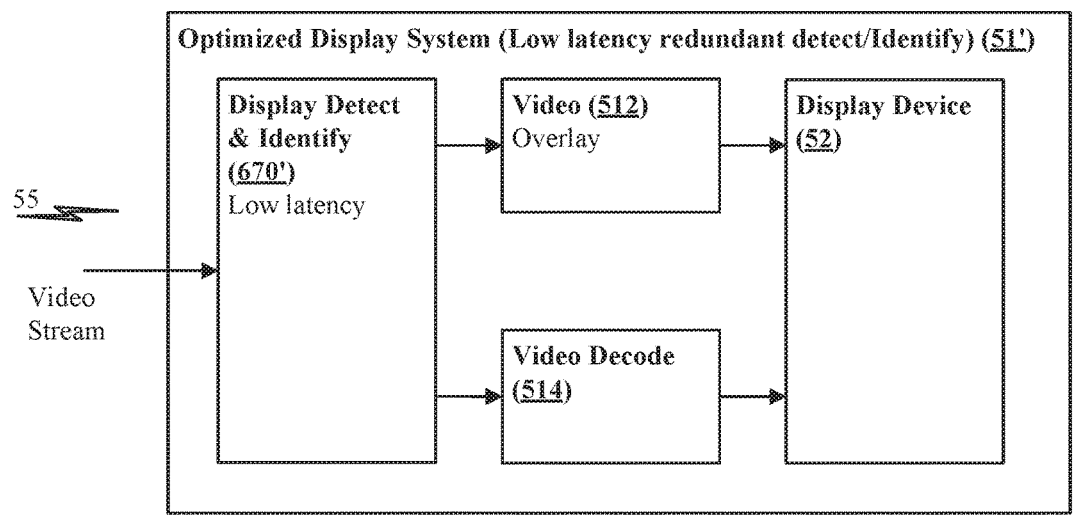
FIG. 12C is a block diagram of various modules of an optimized display system with a low-latency redundant detect and identify module, according to an implementation.
Figure 12D:
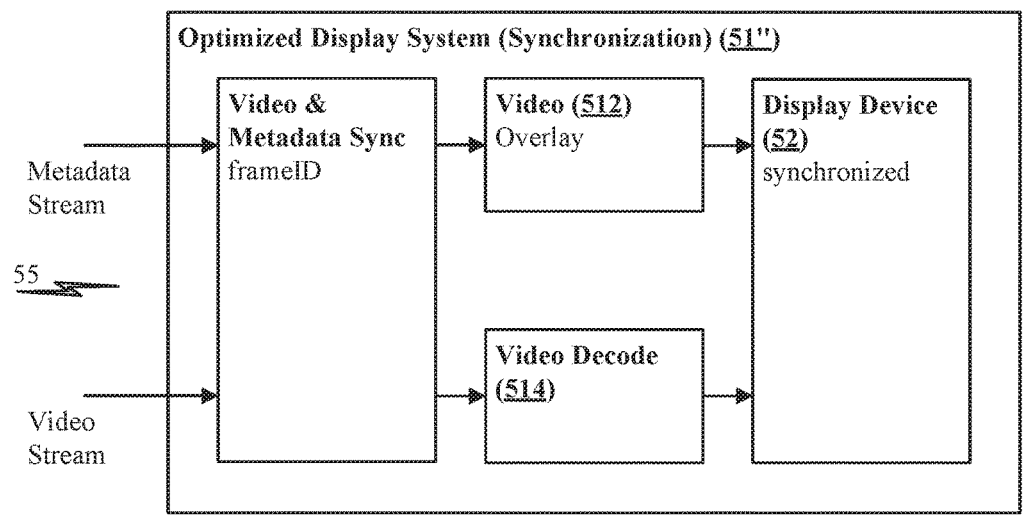
FIG. 12D is a block diagram of various modules of an optimized display system using synchronization techniques, according to an implementation.

FIGS. 12B-12D are block diagrams of various modules of display systems (51, 51', 51") of external devices 50 according to various implementations. FIG. 12B is a block diagram of various modules of an un-optimized display system 51, which is provided with a metadata stream that is an input to a video module 51*a* that performs the overlay function for the display device 52. A video stream is provided as an input to a video decoder 51*b*. In FIG. 12B, the tracking overlay is displayed asynchronously with the decoded video on the display device 52.

FIG. 12C is a block diagram of various modules of an optimized display system 51' with a low-latency redundant detect and/or identify module 670' according to an implementation. In order to reduce latency for the display device 52 to the user on the display system 51' of the external device 50, the video stream may be fed to an input of the redundant detect and/or identify module 670' on the external device 50, and the tracking efficiency and robustness may be improved by using the motion estimates of the MIA 20 and the estimated position and velocity of the target T as discussed above. In this implementation, the metadata stream may not be needed by the display system 51' since the metadata is determined by the redundant detect and/or identify module 670'. The benefit of this is that there may be a lower latency due to the display system 51' having more processing power and potentially dedicated image processing hardware that can execute the algorithm more quickly without requiring propagation of the metadata.

FIG. 12D is a block diagram of various modules of an optimized display system 51" using synchronization techniques according to an implementation. The detection and identification functions may add additional latency to the system, and the tracking overlay or other detection/identification metadata output may trail the video frames constituting the video stream.

In this implementation, the frame ID for each image frame is tagged and sent by the imaging and tracking system 100, 600 in the metadata stream. The system may be pipelined by forwarding the video before the detection algorithm is run. In this optimized display system 51", both the video stream and the metadata stream arrive at a video and metadata sync module of the display system 51" that is able to use the frame ID to synchronize the video metadata with the video frames. The result is that the display device 52 can present the video with its tracking overlay in a synchronized manner while minimizing latency. Use of pipelining can minimize the overall latency, and the synchronizing matches the video to the overlay.

FIGS. 13-21 are block diagrams that illustrate several architectures that may be utilized to implement, detect, identify, and draw functionalities as implemented by different components of the movable imaging system 10.

Figure 13:
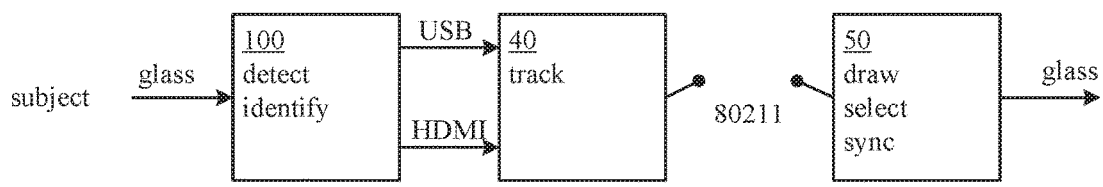
FIGS. 13-21 are block diagrams illustrating various architecture configurations for implementing certain functions of the movable imaging system.

FIG. 13 is a block diagram that illustrates an architecture according to an implementation showing the imaging device 100, movable platform 40, and the external device 50 along with the functionalities of detect, identify, track, draw, select, and synchronize.

Figure 14:
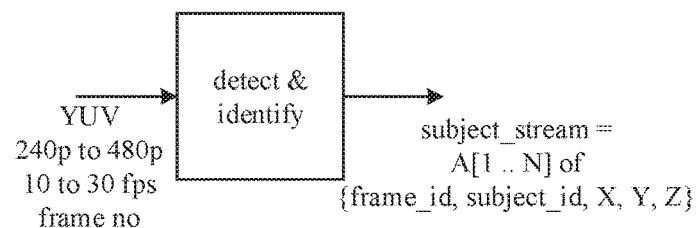

FIG. 14 is a block diagram illustrating the detect and identify functions, which may constitute an image processing block with a frame input and a frame-relative subject stream which contains data related to one or more subjects within the video image frame.

Figure 15:
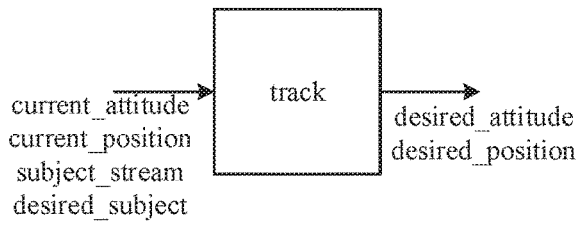

FIG. 15 is a block diagram illustrating the track function, which may use the current attitude and position of the movable platform 40, a subject stream, and a desired subject stream to compute a desired trajectory setpoint.

Figure 16:
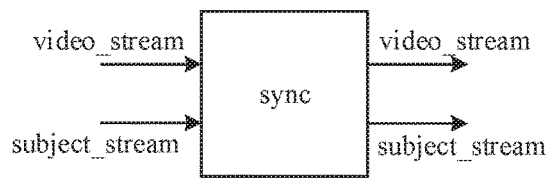

FIG. 16 is a block diagram illustrating the synchronize function (e.g., "sync"), which may be used to implement an elastic buffer to partially or fully align the subject and video stream, although this module may not be necessary if a synchronous architecture is chosen or an asynchronous architecture is chosen with acceptable video and subject layer misalignment.

Figure 17:
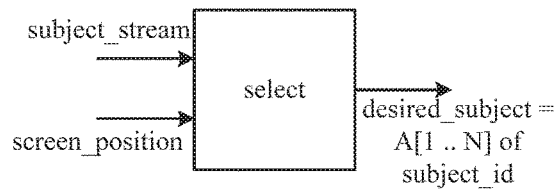

FIG. 17 is a block diagram illustrating the select function that may utilize a user input which is a screen position and the subject stream to compute a desired subject. The purpose of this module is to be able to permit a "touch to select" of a subject on the screen.

Figure 18:
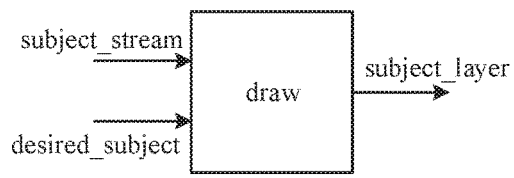

FIG. 18 is a block diagram illustrating a draw function that may use the desired subject stream or all subjects and the subject stream to compute an on-screen display (OSD) overlay layer to be drawn on top of the video stream. The purpose of this module is to visualize the detected and identified subjects on the UI of the external device 50.

Figure 19:
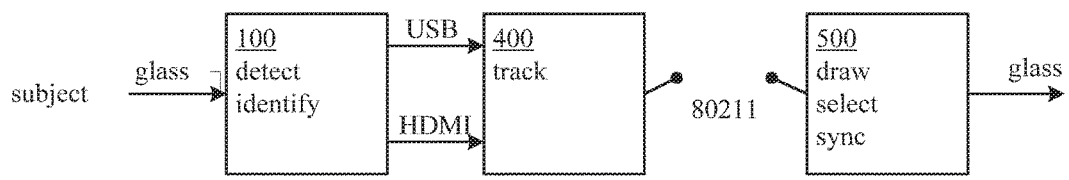

Various alternate solutions can be also provided. For example, FIG. 19 is a block diagram illustrating a distributed solution. In this solution, the detect and identify functions are implemented on the imaging device 100, the track function is implemented on the movable platform 40, and the draw, select, and synchronize functions are implemented on the external device 50.

Figure 20:
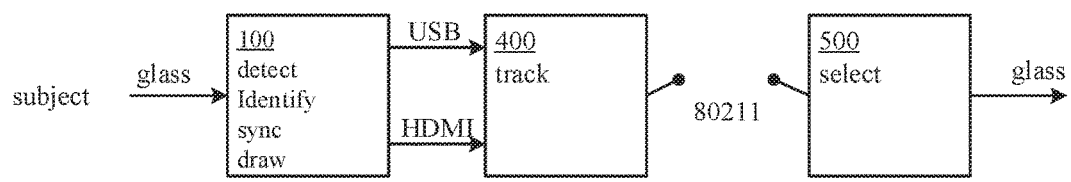

FIG. 20 is a block diagram illustrating a camera-centric solution in which the sync and draw functions are implemented on the imaging device 100 instead of the external device 50.

Figure 21:
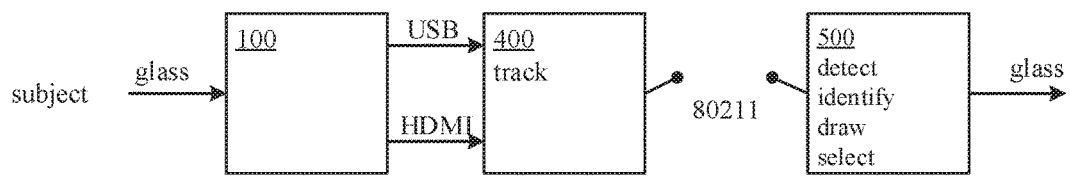

FIG. 21 is a block diagram illustrating a controller-centric solution in which all functionality other than tracking is implemented in the external device 50. In this design, the sync function is not required since this solution is completely synchronous.

In a distributed solution design, the detect and identify modules are implemented and optimized for the imaging device 100. Support may be added to handle a subject stream. The subject stream may contain, e.g., a subject ID, a subject location in the image in, e.g., pixel coordinates, a bounding box around a subject in pixels, a distance to a subject (in an absolute distance or up to scale). The video pipeline may be optimized for low latency and the low resolution video (LRV) stream may be optimized as input for the detect and identify modules. A metadata muxer may be configured to handle a subject stream and to write the subject stream to, e.g., a session mp4 text track. The muxer may be configured to write the subject stream out to a USB/MTP interface.

In the moving platform 40 of the distributed solution design, a USB/MTP interface may be configured to handle a subject stream. A universal asynchronous receiver/transmitter (UART) or other interface may be configured to push the subject stream and desired subject to a flight controller subsystem. A drone command and control (C&C) interface may be configured to handle the desired subject stream. It is possible to implement the sync module before the muxer block, but this design is chosen to implement the sync, if needed, either further up or downstream to minimize the total latency in the system.

In a flight controller of the moving platform 40 for the distributed solution design, the tracking system may be implemented using the subject stream and the desired subject to compute the desired trajectory. A desired MIA 20 trajectory setpoint may be parameterized by, e.g., position, velocity, acceleration, or attitude of the MIA 20. The UART or other interface may be configured to handle the subject stream and the desired subject. A state machine may be configured to implement a tracking state.

The external device 50 in the distributed solution design may be utilized to implement the select, draw, and identify functions as well as any further required UI functions.

Optionally, the sync function may be implemented by the external device 50 in order to align the video stream with the subject stream. The native system may be configured to receive the subject stream over the interface of the movable platform 40 and pass it to an application layer. The external device 50 additionally may send the desired subject to the movable platform 40, while an application on the external device 50 may be configured to handle the subject stream and desired subject as well.

The following description is focused on the differences between the camera-centric and distributed solutions. The processor associated with the movable platform 40 and the flight controller implementations need not change. The imaging device 100 in the camera-centric solution is similar to that of the distributed solution with the addition of sync and draw modules being moved to a position before an HDMI or high speed image/data interface.

The following description is focused on the differences between the control-centric and distributed solutions. The processor associated with the movable platform 40 and flight controller implementations need not change. The imaging device 100 of the control-centric solution may have an added feature that extends the USB/MTP interface to receive a subject stream and mux into the session mp4 text track. In this design, the external device 50 may have the detect and identify functions implemented natively, and the draw function may be implemented natively as well. The sync function is removed because the design is synchronous.

Where certain elements of these implementations may be partially or fully implemented using known components, only those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus," hierarchical bus, network-on-chip, address-event-representation (AER) connection, or other type of communication topology used for accessing, e.g., different memories in a system.

As used herein, the terms "computer," "computing device," and "computerized device" include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C #, Fortran, COBOL, MATLAB™, PASCAL, Python, assembly language, markup languages (e.g., HTML, SGML, XML, VoXML), as well as object-oriented environments such as the Common Object Request Broker Architecture (CORBA), Java™ (including J2ME, Java Beans), Binary Runtime Environment (e.g., BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the term "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:

1. A method for tracking a subject in successive image frames comprising:
   obtaining previous image frames with an imaging device at previous times;
   processing the previous image frames to determine previous frame positions of a subject therein;
   obtaining motion information of the imaging device;
   obtaining motion information of the subject from one or more sensors physically associated with the subject;
   determining a region of interest for a subsequent image frame to be obtained at a subsequent time after the previous times, including determining a predicted frame position of the subject in the subsequent image frame from the motion information of the imaging device, the motion information of the subject, and the previous frame positions, and locating the region of interest in a predetermined spatial relationship relative to the predicted frame position;
   obtaining the subsequent image frame at the subsequent time; and
   processing the region of interest of the subsequent image frame to determine a frame position of the subject.

2. The method of claim 1, wherein the determining the predicted frame position is determined from the previous frame positions, motion information of the imaging device, and motion information of the subject.

3. The method of claim 1, further comprising determining another region of interest for another subsequent image frame to be obtained at another subsequent time after the subsequent time, including determining another predicted frame position of the subject in the other subsequent image frame from at least one of the motion information or a combination of the subsequent frame position and one or more of the previous frame positions;
   obtaining the other subsequent image frame at the other subsequent time; and
   processing the other region of interest of the other subsequent image frame to determine another frame position of the subject.

4. A method for tracking a subject in successive image frames comprising:
   determining a predicted frame location at which a subject is estimated to appear in a subsequent image frame to be obtained at a subsequent time;
   determining a region of interest corresponding to the subsequent image frame, including determining a location of the region of interest to be in a predetermined spatial relationship relative to the predicted frame location;
   obtaining the subsequent image frame at the subsequent time with an imaging device; and
   processing the region of interest of the subsequent image frame to locate the subject,
   wherein the predicted frame location is determined according to visual information from previous image frames, motion information of the imaging device, and motion information of the subject, the motion information of the subject being obtained from one or more sensors physically associated with the subject.

5. The method of claim 4, wherein the predetermined spatial relationship is the predicted frame location centered in the region of interest.

6. The method of claim 4, wherein the determining the region of interest includes determining a size of the region of interest.

7. The method of claim 6, wherein the determining the size of the region of interest includes increasing or decreasing the size of the region of interest relative to a previous region of interest corresponding to a previous image frame.

8. The method of claim 6, wherein the size of the region of interest is determined according to at least one of a predicted size of the subject or a predicted distance between the subject and the imaging device in real space.

9. The method of claim 4, wherein the method further comprises obtaining the previous image frames with the imaging device, wherein the predicted frame location is determined according to the visual information derived from the previous image frames, the previous image frames were obtained by the imaging device, and the visual information includes previous frame positions of the subject within the previous image frames.

10. The method of claim 9, wherein predicted frame location is determined according to a visual motion estimate of the subject, the visual motion estimate being determined by applying a motion model to the previous frame positions.

11. The method of claim 4, wherein the predicted frame location is determined according to the motion information of the imaging device obtained from one or more sensors physically associated with the imaging device.

12. The method of claim 11, wherein the motion information of the imaging device includes one or more of position information and orientation information of the imaging device relative to real space.

13. The method of claim 12, wherein predicted frame location is determined according to a imaging device motion estimate of the imaging device, and the one or more sensors include a gyroscope.

14. The method of claim 4, wherein the motion information of the subject includes position information of the subject relative to real space.

15. The method of claim 14, wherein the predicted frame location is determined according to a subject motion estimate of the subject.

16. The method of claim 4, wherein the predicted frame location is determined according to the image data from the previous image frames, the motion information of the imaging device, and the motion information of the subject.

17. The method of claim 16, wherein the predicted frame location is determined according to a visual motion estimate determined from frame positions of the subject in the previous image frames, an imaging device motion estimate determined from the motion information of the imaging device obtained from a sensor physically associated with the imaging device, and a subject motion estimate determined from the motion information of the subject obtained from another sensor physically associated with the subject.

18. A movable imaging system comprising:

a movable platform movable in real space;

an imaging device for capturing successive image frames that form a video and being connected to the movable platform; and a tracking system for maintaining a subject in the successive image frames, wherein the tracking system locates a region of interest for a subsequent image frame at a predicted frame location of the subject in a future image frame based on previous frame positions of the subject in the successive images, motion information of the imaging device, and motion information of the subject obtained from one or more sensors physically associated with the subject, and thereafter processes the region of interest of the future image frame to locate the subject in the future image frame.

* * * * *